US009758153B2

(12) United States Patent
Ogawa

(10) Patent No.: US 9,758,153 B2
(45) Date of Patent: Sep. 12, 2017

(54) HYBRID VEHICLE CONTROL APPARATUS

(71) Applicant: TOYOTA JIDOSHA KABUSHIKI KAISHA, Toyota-shi, Aichi (JP)

(72) Inventor: Yuki Ogawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/244,411

(22) Filed: Aug. 23, 2016

(65) Prior Publication Data
US 2017/0088117 A1 Mar. 30, 2017

(30) Foreign Application Priority Data

Sep. 30, 2015 (JP) .................................. 2015-194893

(51) Int. Cl.
*B60L 9/00* (2006.01)
*B60W 20/12* (2016.01)
(Continued)

(52) U.S. Cl.
CPC ............. *B60W 20/12* (2016.01); *B60K 6/445* (2013.01); *B60L 7/10* (2013.01); *B60L 11/1862* (2013.01); *B60W 10/06* (2013.01); *B60W 10/08* (2013.01); *B60W 30/18127* (2013.01); *B60W 50/0097* (2013.01); *B60W 2550/143* (2013.01); *B60W 2550/145* (2013.01); *B60W 2550/402* (2013.01); *B60W 2710/244* (2013.01);
(Continued)

(58) Field of Classification Search
CPC ............. G06K 9/00536; G06K 9/6284; G06K 9/6215; G06K 19/07758; G06K 2017/0096; G06K 9/623; G06K 9/626
See application file for complete search history.

(56) References Cited

U.S. PATENT DOCUMENTS 5,778,326 A 7/1998 Moroto et al.
8,862,938 B2 * 10/2014 Souvannarath ..... G06F 11/0709
709/208
(Continued)

FOREIGN PATENT DOCUMENTS

JP 2005-160269 A 6/2005
JP 2011-006047 A 1/2011

OTHER PUBLICATIONS

Jun. 16, 2017 Office Action issued in U.S. Appl. No. 15/215,272.

*Primary Examiner* — Redhwan K Mawari
(74) *Attorney, Agent, or Firm* — Oliff PLC

(57) ABSTRACT

A control apparatus for a hybrid vehicle including an internal combustion engine, a motor, and a storage battery and which charges the storage battery with electric power generated as a result of regenerative braking and electric power generated by using an output of the engine. When a planned travel route includes a downhill section whose height difference is greater than a predetermined height difference threshold, the controller executes a downhill control operation that decreases the target remaining capacity of the storage battery. The controller increases the height difference threshold as the estimated average speed of the vehicle during travel in the downhill section increases, to thereby restrain the execution of the downhill control for a downhill section in which an increase in the remaining capacity is not expected due to a large air resistance acting on the vehicle.

6 Claims, 16 Drawing Sheets

(51) Int. Cl.
   *B60L 7/10*     (2006.01)
   *B60L 11/18*    (2006.01)
   *B60W 10/06*    (2006.01)
   *B60W 10/08*    (2006.01)
   *B60W 30/18*    (2012.01)
   *B60K 6/445*    (2007.10)
   *B60W 50/00*    (2006.01)

(52) U.S. Cl.
   CPC ... *B60W 2720/103* (2013.01); *B60W 2750/00* (2013.01); *Y10S 903/93* (2013.01); *Y10S 903/947* (2013.01)

(56) References Cited

U.S. PATENT DOCUMENTS

| | | | |
|---|---|---|---|
| 9,471,452 B2 * | 10/2016 | McElhinney | G06F 11/0751 |
| 2008/0319596 A1 | 12/2008 | Yamada | |
| 2008/0319597 A1 | 12/2008 | Yamada | |
| 2010/0305799 A1 | 12/2010 | Yamada et al. | |
| 2012/0032637 A1 | 2/2012 | Kotooka et al. | |
| 2013/0015860 A1 | 1/2013 | Crombez | |
| 2013/0296102 A1 | 11/2013 | Banker et al. | |
| 2014/0121868 A1 * | 5/2014 | Zhang | B60W 10/04 701/22 |
| 2015/0019057 A1 | 1/2015 | Morisaki et al. | |
| 2016/0167641 A1 | 6/2016 | Yoon | |

* cited by examiner

HYBRID VEHICLE CONTROL APPARATUS

BACKGROUND

1. Technical Field

The present disclosure relates to a control apparatus for a hybrid vehicle which includes both an internal combustion engine and a motor as drive sources of the vehicle.

2. Description of Related Art

There has been known a hybrid vehicle (hereinafter also referred to as the "vehicle" for simplicity) which includes both an internal combustion engine (hereinafter also referred to as the "engine" for simplicity) and a motor as drive sources of the vehicle. Such a vehicle includes a storage battery which supplies electric power to the motor and which is charged by output of the engine.

In addition, when rotation of a wheel axle is transmitted to the motor, the motor generates electric power (i.e., an electric generator generates electric power), and the storage battery is charged by the electric power as well. Namely, the kinetic energy of the vehicle is converted to electrical energy, and the electrical energy is collected by the storage battery. This energy conversion is also called "regeneration." When regeneration is performed, the motor generates a force for braking the vehicle (torque for decreasing the speed of the vehicle). The braking force is also called "regenerative braking force."

The fuel efficiency (fuel consumption rate) of the vehicle can be improved by collecting, by means of regeneration during deceleration, a portion of energy consumed by the engine or the motor during acceleration or constant-speed travel of the vehicle, and storing the collected energy in the storage battery. During travel of the vehicle, the remaining capacity SOC (State of Charge) of the storage battery fluctuates.

Deterioration of the storage battery accelerates as a result of an increase in the remaining capacity SOC when the remaining capacity SOC is high and as a result of a decrease in the remaining capacity SOC when the remaining capacity SOC is low. Therefore, during travel of the vehicle, the control apparatus of the vehicle maintains the remaining capacity SOC at a level between a predetermined remaining capacity upper limit and a predetermined remaining capacity lower limit.

Incidentally, in the case where the vehicle travels in a downhill section, the vehicle continuously accelerates even when neither the engine nor the motor generates torque. Therefore, a driver of the vehicle removes his/her foot from the accelerator pedal and may press down on the brake pedal so as to request the vehicle to produce braking force. At that time, the vehicle restrains an increase in the vehicle speed by means of regenerative braking force and increases the remaining capacity SOC.

When the remaining capacity SOC increases; i.e., when the amount of electric power stored in the storage battery increases, the vehicle can travel over a longer distance by using the output of the motor only without operating the engine. Accordingly, if the remaining capacity SOC can be increased as much as possible within a range below the remaining capacity upper limit when the vehicle travels in a downhill section, the fuel efficiency of the vehicle can be improved further.

However, when the downhill section is long, the remaining capacity SOC reaches the remaining capacity upper limit, which makes it impossible to increase the remaining capacity SOC further. Accordingly, the greater the difference between the remaining capacity upper limit and the remaining capacity SOC at the start point of the downhill section, the greater the effect in improving fuel efficiency attained as a result of the travel in the downhill section.

In view of the foregoing, one conventional drive control apparatus (hereinafter also referred to as the "conventional apparatus") raises the remaining capacity upper limit and lowers the remaining capacity lower limit when a travel route contains a downhill section having a predetermined height difference. In addition, the conventional apparatus puts higher priority to travel by means of the motor than to travel by means of the engine such that the remaining capacity SOC approaches the "lowered remaining capacity lower limit" to the greatest extent possible before the vehicle enters the downhill section (see, for example, Japanese Patent Application Laid-Open (kokai) No. 2005-160269).

Incidentally, in order to execute a control (downhill control) for increasing the remaining capacity SOC, while the vehicle is travelling in a downhill section, to thereby improve the fuel efficiency of the vehicle without fail, it is necessary to properly extract a downhill section (target-downhill-section) which is contained in a planned travel route and which is subjected to the downhill control. The conventional apparatus has extracted such a target-downhill-section by paying attention only to the above-mentioned predetermined height difference (height difference threshold). In other words, for extraction of such a target-downhill-section, the conventional apparatus did not take into consideration the air resistance acting on the vehicle.

More specifically, the air resistance acting on the vehicle is proportional to the square of the vehicle speed. Therefore, in the case where the vehicle speed during travel in a downhill section is high, an increase in the remaining capacity SOC is highly likely to become smaller as compared with the case where the vehicle speed during travel in that downhill section is low. More specifically, when the vehicle travels in a downhill section, the remaining capacity SOC increases as a result of conversion of the potential energy of the vehicle to kinetic energy and then to electrical energy. When the air resistance acting on the vehicle travelling in a downhill section increases, the loss produced at the time of conversion from the potential energy to the kinetic energy increases, and thus the amount of the obtained electrical energy (namely, the increase in the remaining capacity SOC) becomes smaller.

Therefore, when the conventional apparatus extracts a "downhill section in which the vehicle travels at high vehicle speed" as a target-downhill-section because the height difference of that downhill section is greater than the above-mentioned height difference threshold and executes the downhill control, there is very likely to arise a situation in which the remaining capacity SOC does not increase sufficiently before the vehicle ends the travel in that downhill section. As a result, the remaining capacity SOC may reach the remaining capacity lower limit, and forced charging (charging the storage battery by the output of the engine) may occur.

Meanwhile, in a downhill section in which the height difference is small but the vehicle travels at low vehicle speed, there is a possibility that electrical energy can be collected sufficiently. However, the conventional apparatus does not execute the downhill control for such a downhill section because the height difference is smaller than the height difference threshold. Accordingly, the conventional apparatus may fail to yield the fuel efficiency improving effect to a sufficient degree.

SUMMARY

One object of the disclosure is to provide a hybrid vehicle control apparatus which can properly extract a target-downhill-section contained in a planned travel route of a vehicle by taking into consideration the vehicle speed at which the vehicle travels in that section, to thereby improve the fuel efficiency of the vehicle and suppress deterioration of a storage battery.

A hybrid vehicle control apparatus for achieving the above-described object (hereinafter also referred to as "an apparatus according to a first aspect") is applied to a hybrid vehicle which includes an internal combustion engine and a motor as drive sources of the vehicle, and a storage battery that supplies electric power to the motor, the vehicle being configured to perform regenerative braking by using the motor as a generator, and charge the storage battery with electric power generated as a result of the regenerative braking and electric power generated by using an output of the internal combustion engine.

The apparatus according to the first aspect comprises a controller configured to control the internal combustion engine and the motor so that a demanded drive force for the vehicle is satisfied and a remaining capacity of the storage battery remains above a predetermined minimum target remaining capacity.

The controller is configured to obtain a planned travel route of the vehicle and extract a downhill section from the planned travel route as a target-downhill-section, the downhill section having a height difference between a start point and an end point of the downhill section, the height difference being greater in absolute value than a predetermined height difference threshold.

In the case where the target-downhill-section is extracted, the controller executes a downhill control operation while the vehicle travels in a particular section which extends to the end point of the target-downhill-section from a downhill control start point which is located upstream of the start point of the target-downhill-section by a predetermined distance. The downhill control operation decreases the predetermined minimum target remaining capacity at least in a portion of the particular section between the downhill control start point and the start point of the target-downhill-section compared with when the vehicle travels in sections other than the particular section.

Further, the controller sets the predetermined height difference threshold based on an estimated average speed of the vehicle during travel in the downhill section so that when the estimated average speed is a first speed, the predetermined height difference threshold is set to a relatively larger value as compared to when the estimated average speed of the vehicle is a second speed lower than the first speed.

When the estimated average speed is high, the apparatus according to the first aspect increases the height difference threshold, because the air resistance acting on the vehicle becomes relatively large when the vehicle travels through the target-downhill-section. In other words, since the height difference threshold is set to a larger value for a downhill section in which the air resistance during travel becomes large, the downhill section is not determined to be a target-downhill-section unless the height difference of that downhill section is large.

Accordingly, the apparatus according to the first aspect can properly extract a target-downhill-section in consideration of the vehicle speed during travel in that section. As a result, the effect of improving fuel efficiency through execution of the downhill control can be obtained more surely. In addition, the apparatus can restrain occurrence of a phenomenon that since the remaining capacity SOC does not increase sufficiently during the travel in the target-downhill-section, charging and discharging are repeated in a state in which the remaining capacity SOC is low, whereby deterioration of the storage battery accelerates.

In one mode of the apparatus, the controller extracts the target-downhill-section from downhill sections each composed of continuous road sections whose road types are only an expressway or only a non-expressway; and the controller estimates that the estimated average speed is the first speed when the road type of a certain downhill section is the expressway and estimates that the estimated average speed is the second speed when the road type of the downhill section is the non-expressway.

When the vehicle travels on an expressway, the average vehicle speed is likely to be higher than that in the case where the vehicle travels on a non-expressways (e.g., an ordinary road). In view of this, the apparatus increases the height difference threshold used for extraction of a target-downhill-section when that section is an expressway. Accordingly, this mode makes it possible to properly extract a target-downhill-section by simple processing.

In another mode of the apparatus, the controller estimates the estimated average speed based on an average speed at which the vehicle or vehicles other than the vehicle traveled through the downhill section in the past.

The average vehicle speed at which the above-described vehicle (namely, the vehicle on which the apparatus is mounted) actually travelled through a certain downhill section may be used as the estimated average speed of the vehicle at the time when the vehicle travels through that downhill section again. In the case where the vehicle has traveled through that downhill section a plurality of times, the average of the plurality of average vehicle speeds may be used as the estimated average speed.

Alternatively, a certain downhill section may be considered to be composed of a plurality of road sections, and the average of the plurality of average vehicle speeds at which the vehicle actually travelled through the each road section, respectively, may be used as the estimated average speed. In the case where the vehicle did not travel through a portion of the road sections, the average speed of those sections may be obtained by other methods.

Further, the average vehicle speed at which a vehicle different from the above-described vehicle actually traveled through a certain downhill section (or a certain road section) may be used as the estimated average speed of the above-described vehicle at the time when the above-described vehicle travels through that downhill section (or that road section).

As described above, the apparatus estimates that the higher the actual average vehicle speed at which the above-mentioned vehicle or other vehicles travelled through a downhill section in the past, the higher the estimated average speed of the vehicle at which the vehicle travels through that downhill section, and increases the height difference threshold in accordance with the estimated average speed. Therefore, according to the present mode, it is possible to extract a target-downhill-section more reliably.

DESCRIPTION OF PREFERRED EMBODIMENTS

Hybrid vehicle control apparatus according to embodiments will now be described with reference to the drawings.

First Embodiment

Figure 1:
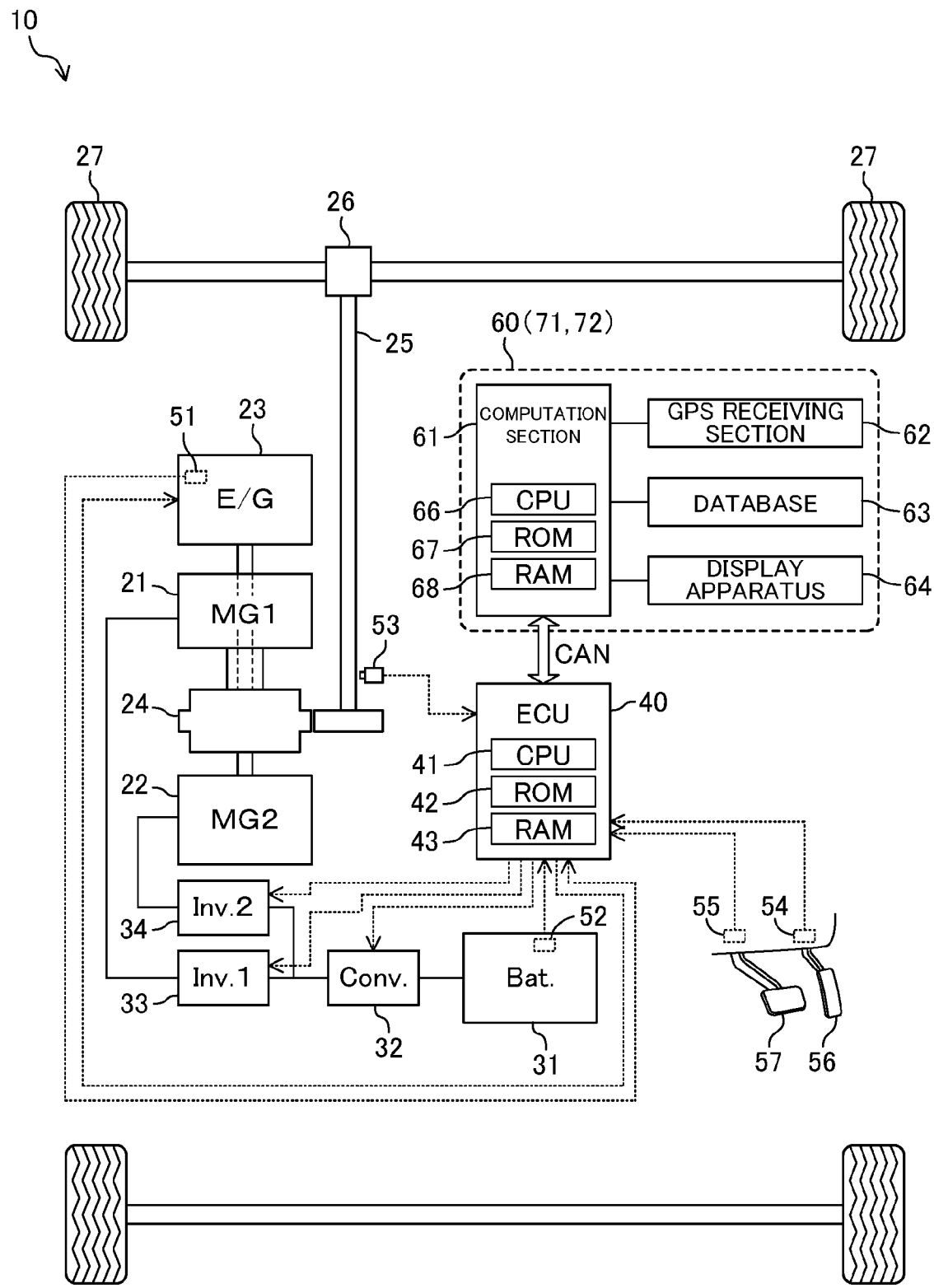
FIG. 1 is a schematic illustration of a vehicle to which a hybrid vehicle control apparatus (first control apparatus) according to a first embodiment is applied.

A hybrid vehicle control apparatus according to a first embodiment (hereinafter also referred to as the "first control apparatus") is applied to a vehicle 10 as shown in FIG. 1. The vehicle 10 includes a first motor 21, a second motor 22, and an engine 23. Namely, the vehicle 10 is a hybrid vehicle.

The vehicle 10 further includes a power split mechanism 24, a storage battery 31, a step-up converter 32, a first inverter 33, a second inverter 34, an ECU (Electronic Control Unit) 40, and a travel assisting apparatus 60. The ECU 40 and the travel assisting apparatus 60 constitute the first control apparatus.

Each of the first motor 21 and the second motor 22 is a three-phase synchronous generator-motor which functions as a generator and a motor. The first motor 21 is mainly used as a generator. The first motor 21 also cranks the engine 23 when the engine 23 is to be started. The second motor 22 is mainly used as a motor and can generate vehicle drive force (torque for causing the vehicle to travel) for the vehicle 10.

The engine 23 can also generate vehicle drive force for the vehicle 10. The engine 23 is a four-cylinder, four-cycle gasoline engine.

The power split mechanism 24 is a planetary gear mechanism.

The power split mechanism 24 includes a ring gear, a plurality of power split planetary gears, a plurality of reduction planetary gears, a first sun gear, a second sun gear, a first planetary carrier, and a second planetary carrier (all the components are not shown).

Each of the power split planetary gears and the reduction planetary gears is in meshing engagement with the ring gear. The first sun gear is in meshing engagement with the power split planetary gears. The second sun gear is in meshing engagement with the reduction planetary gears. The first planetary carrier holds the plurality of power split planetary gears in such a manner that the power split planetary gears can rotate about their axes, respectively, and the power split planetary gears can revolve around the first sun gear. The second planetary carrier holds the plurality of reduction planetary gears in such a manner that the reduction planetary gears can rotate about their axes, respectively.

The ring gear is connected to an axle 25 through a counter gear disposed on the outer periphery of the ring gear in such a manner that torque can be transmitted from the ring gear to the axle 25. The output shaft of the engine 23 is coupled to the first planetary carrier in such a manner that torque can be transmitted from the output shaft of the engine 23 to the first planetary carrier. The output shaft of the first motor 21 is coupled to the first sun gear in such a manner that torque can be transmitted from the output shaft of the first motor 21 to the first sun gear. The output shaft of the second motor 22 is coupled to the second sun gear in such a manner that torque can be transmitted from the output shaft of the second motor 22 to the second sun gear.

Figure 2:
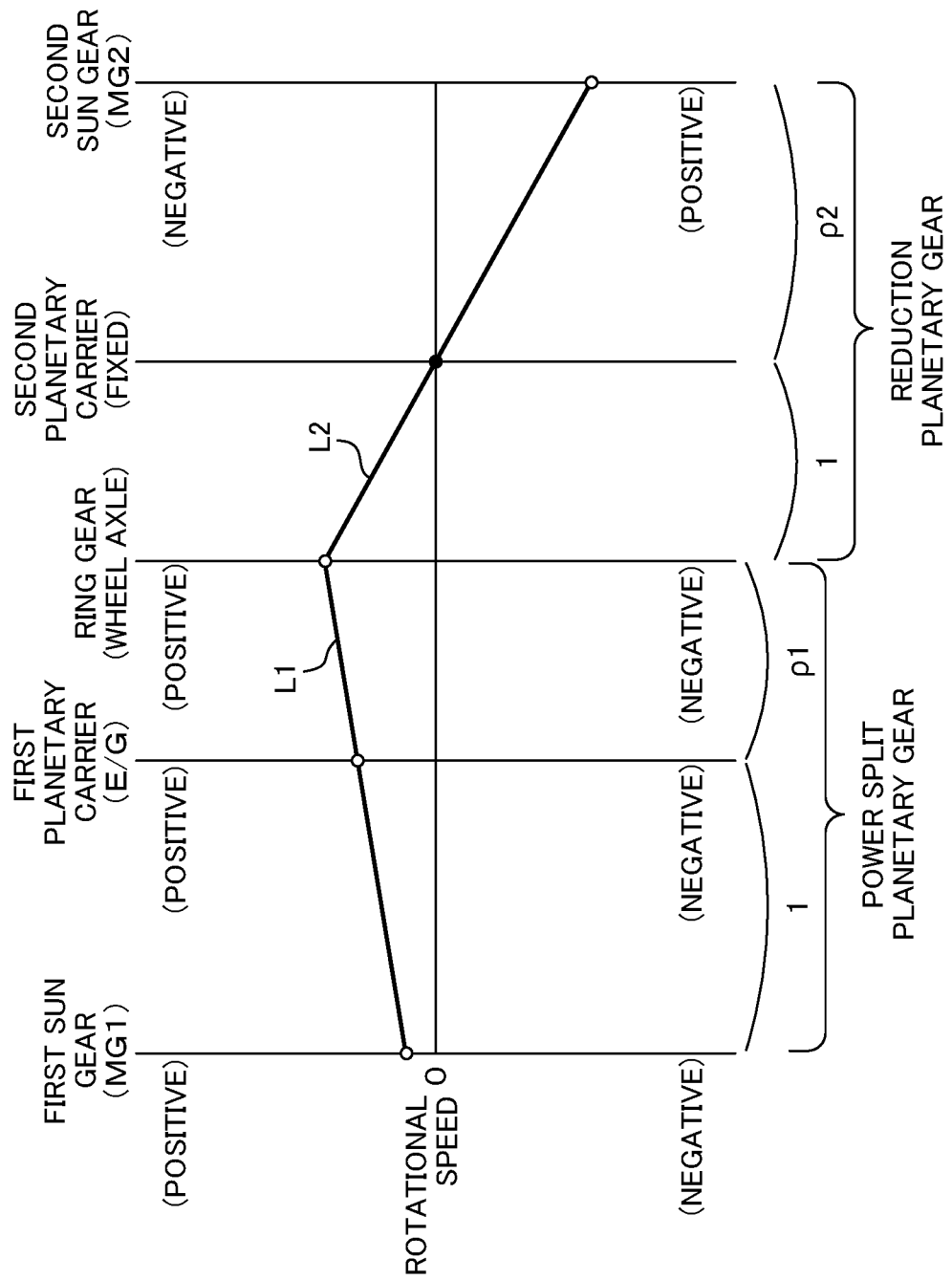
FIG. 2 is an alignment chart which represents the relation among rotational speeds of a first motor, a second motor, an engine, and a ring gear.

The relation among the rotational speed (MG1 rotational speed) Nm1 of the first motor 21, the engine rotational speed NE of the engine 23, and the ring gear rotational speed Nr of the power split mechanism 24, and the relation between the rotational speed (MG2 rotational speed) Nm2 of the second motor 22 and the ring gear rotational speed Nr are represented by a well known alignment chart shown in FIG. 2. The two straight lines shown in the alignment chart will be also referred to as an operation collinear line L1 and an operation collinear line L2.

According to the operation collinear line L1, the relation between the MG1 rotational speed Nm1, and the engine rotational speed NE and the ring gear rotational speed Nr can be represented by the following expression (1). The gear ratio $\rho 1$ in the expression (1) is the ratio of the number of the teeth of the first sun gear to the number of the teeth of the ring gear (namely, $\rho 1$=the number of the teeth of the first sun gear/the number of the teeth of the ring gear).

$$Nm1 = Ni - (Nr - NE) \times (1 + \rho 1)/\rho 1 \qquad (1)$$

Meanwhile, according to the operation collinear line L2, the relation between the MG2 rotational speed Nm2 and the ring gear rotational speed Nr can be represented by the following expression (2). The gear ratio $\rho 2$ in the expression (2) is the ratio of the number of the teeth of the second sun gear to the number of the teeth of the ring gear (namely, $\rho 2$=the number of the teeth of the second sun gear/the number of the teeth of the ring gear).

$$Nm2 = Nr \times (1 + \rho 2)/\rho 2 - Nr \qquad (2)$$

Referring back to FIG. 1, the axle 25 is coupled to drive wheels 27 through a differential gear 26 in such a manner that torque can be transmitted from the axle 25 to the drive wheels 27.

The storage battery 31 is a secondary battery (lithium ion battery in the present embodiment) which can be charged and discharged. DC electric power output from the storage battery 31 undergoes voltage conversion (step-up) performed by the step-up converter 32 and becomes high-voltage electric power. The first inverter 33 converts the high-voltage electric power to AC electric power and supplies the AC electric power to the first motor 21. Similarly, the second inverter 34 converts the high-voltage electric power to AC electric power and supplies the AC electric power to the second motor 22.

Meanwhile, when the first motor 21 operates as a generator, the first inverter 33 converts the generated AC electric power to DC electric power and supplies the DC electric power to the step-up converter 32 and/or the second inverter 34. Similarly, when the second motor 22 operates as a generator, the second inverter 34 converts the generated AC electric power to DC electric power and supplies the DC electric power to the step-up converter 32 and/or the first inverter 33. The step-up converter 32 steps down the DC electric power supplied from the first inverter 33 and/or the second inverter 34 and supplies the stepped up DC electric power to the storage battery 31. As a result, the storage battery 31 is charged.

The ECU 40 is a microcomputer which includes a CPU 41, a ROM 42 for storing programs to be executed by the CPU 41, lookup tables (maps), etc., a RAM 43 for temporarily storing data, and other necessary components. The ECU 40 controls the engine 23, the step-up converter 32, the first inverter 33, and the second inverter 34.

The ECU 40 is connected to a crank angle sensor 51, an ammeter 52, a vehicle speed sensor 53, an accelerator operation amount sensor 54, and a brake operation amount sensor 55.

The crank angle sensor 51 measures the rotational position of the crankshaft of the engine 23 and outputs a signal which represents its crank angle CA. The ECU 40 calculates the engine rotational speed NE of the engine 23 on the basis of the crank angle CA. The ammeter 52 outputs a signal which represents current IB flowing through the storage battery 31. The ECU 40 calculates a remaining capacity SOC, which is the amount of electric power charged in the storage battery, on the basis of the current IB.

The vehicle speed sensor 53 detects the rotational speed of the axle 25 and outputs a signal which represents the travel speed (vehicle speed) Vs of the vehicle 10. The accelerator operation amount sensor 54 outputs a signal which represents the operation amount (accelerator operation amount) Ap of an accelerator pedal 56. The brake operation amount sensor 55 outputs a signal which represents the operation amount (brake operation amount) Bp of a brake pedal 57.

The travel assisting apparatus 60 includes a computation section 61, a GPS receiving section 62, a database 63, and a display apparatus 64.

The GPS receiving section 62 obtains the present position Pn of the vehicle 10 on the basis of signals (radio waves) from GPS (Global Positioning System) satellites and outputs a signal representing the present position Pn to the computation section 61.

The database 63 is formed by a hard disk drive (HDD) and stores a map database. The map database includes information (map information) regarding "nodes" such as intersections, dead ends, etc., "links" which connect the nodes, and "facilities" such as buildings, parking lots, etc. located along the links. Further, the map database includes pieces of information provided for each link; i.e., the distance of a section (road), the positions of nodes specifying one end (start position) and the other end (end position) of each link, and the average gradient of each link (the ratio of the height difference between the opposite ends of the link to the distance between the opposite ends of the link).

The display apparatus 64 is disposed on a center console (not shown) provided within the compartment of the vehicle 10. The display apparatus 64 has a display and can display the map information stored in the map database, together with the present position Pn, in response to an operation by a driver of the vehicle 10.

The display of the display apparatus 64 also operates as a touch panel. Accordingly, the driver can operate the travel assisting apparatus 60 by touching the display of the display apparatus 64. Further, the display apparatus 64 includes a sound generation unit (not shown). The display apparatus 64 can perform reproduction of a warning beep and announce a message, etc., in accordance with instructions from the computation section 61.

The computation section 61 is a microcomputer which includes a CPU 66, a ROM 67 for storing programs to be executed by the CPU 66, lookup tables (maps), etc., a RAM 68 for temporarily storing data, and other necessary components. The computation section 61 can exchange information with the ECU 40 through a CAN (Controller Area Network). The computation section 61 will be also referred to as the "travel assisting ECU," and the ECU 40 will be also referred to as the "vehicle control ECU."

When the driver of the vehicle 10 enters a destination by using the display apparatus 64, the computation section 61 searches a route (planned travel route) from the present position Pn to the destination on the basis of the map database. The planned travel route is defined by a group of nodes. The computation section 61 provides a route guidance by using displays on the display apparatus 64 and sounds generated from the sound generation unit such that the driver can pass through the planned travel route.

(Control of Generated Torque by ECU)

Next, operation of the ECU 40 will be described.

The ECU 40 determines a demanded ring gear torque Tr*, which is a target value of the torque (ring gear generation torque) Tr acting on the ring gear, on the basis of the accelerator operation amount Ap and the vehicle speed Vs. Since the ring gear generation torque Tr is in proportion to the torque acting on the drive wheels 27, the torque acting on the drive wheels 27 increases as the ring gear generation torque Tr increases.

The ECU 40 controls the engine 23, the step-up converter 32, the first inverter 33, and the second inverter 34 such that the ring gear generation torque Tr becomes equal to the demanded ring gear torque Tr* and the remaining capacity SOC coincides with (approaches) a target remaining capacity SOC*.

For example, in the case where the remaining capacity SOC approximately coincides with the target remaining capacity SOC*, in an operation region within which the operation efficiency of the engine 23 is high, the ECU 40 causes both the engine 23 and the second motor 22 to generate outputs, and causes the first motor 21 to generate electric power by using a portion of the engine output Pe (the output of the engine 23). In this case, the electric power generated by the first motor 21 is supplied to the second motor 22. Accordingly, the remaining capacity SOC is maintained at the target remaining capacity SOC*.

In the case where the remaining capacity SOC is lower than the target remaining capacity SOC*, the ECU 40 increases the engine output Pe to thereby increase the amount of electric power generated by the first motor 21. As a result, the remaining capacity SOC increases.

Meanwhile, when the engine 23 is in an operation region within which the operation efficiency of the engine 23 is low (for example, at the time of start of the vehicle 10 and at the time of low-load travel), the ECU 40 stops the operation of the engine 23 and causes the second motor 22 only to generate an output. In this case, the remaining capacity SOC decreases. However, when the remaining capacity SOC is less than a remaining capacity lower limit Smin, the ECU 40 executes "forced charging" by operating the engine 23 and causing the first motor 21 to generate electric power. As a result, the remaining capacity SOC becomes greater than the remaining capacity lower limit Smin.

In the case where the remaining capacity SOC is greater than a remaining capacity upper limit Smax, even when the engine 23 is in the operation region within which the operation efficiency of the engine 23 is high, the ECU 40 stops the operation of the engine 23 except the case where a large output and a large torque are demanded, and causes the second motor 22 only to generate an output. As a result, the remaining capacity SOC becomes less than the remaining capacity upper limit Smax.

(Control of Braking Force by ECU)

When the driver demands the vehicle 10 to generate a braking force, the driver performs an operation for setting both the accelerator operation amount Ap and the brake operation amount Bp to "0" or an operation for increasing the brake operation amount Bp after setting the accelerator operation amount Ap to "0." When the generation of a braking force is demanded, the ECU 40 generates a regenerative braking force and a frictional braking force. At that time, the regenerative braking force is supplemented by the frictional braking force to generate the demanded braking force.

When the regenerative braking force is to be generated, the ECU 40 causes the first motor 21 and/or the second motor 22 to generate electric power. In other words, the ECU 40 converts the kinetic energy of the vehicle 10 to electrical energy through use of the first motor 21 and/or the second motor 22. The generated electric power is charged in the storage battery 31, whereby the remaining capacity SOC increases.

When the frictional braking force is to be generated, the ECU 40 requests a brake apparatus (not shown) to apply frictional forces to brake discs provided on the wheels of the vehicle 10, including the drive wheels 27. In other words, the ECU 40 converts the kinetic energy of the vehicle 10 to thermal energy through use of the brake apparatus.

The ECU 40 controls the first motor 21, the second motor 22, and the brake apparatus such that the total braking force, which is the sum of the regenerative braking force and the frictional braking force, becomes equal to the braking force demanded by the driver.

(Downhill Control)

In the case where the vehicle 10 travels in a downhill section, if the vehicle 10 generates no braking force, the vehicle speed Vs increases even when no torque is transmitted to the drive wheels 27. When the vehicle speed Vs becomes higher than a speed which the driver expects, the driver demands a braking force. The entirety or a portion of the demanded braking force is provided by the regenerative braking force. Therefore, during the travel in the downhill section, the frequency at which the first motor 21 and/or the second motor 22 generates electric power increases, whereby the remaining capacity SOC increases. In other words, the ECU 40 converts the potential energy of the vehicle 10 to kinetic energy and then to electrical energy.

When the remaining capacity SOC increases, the frequency at which the engine 23 is operated to charge the storage battery 31 decreases, and a portion of the output of the engine 23, which portion is used for charging the storage battery 31, decreases. Therefore, the fuel efficiency of the vehicle 10 improves. However, when the remaining capacity SOC reaches the remaining capacity upper limit Smax in the middle of the downhill section, it becomes impossible to increase the remaining capacity SOC more and improve the fuel efficiency more.

Figure 3:
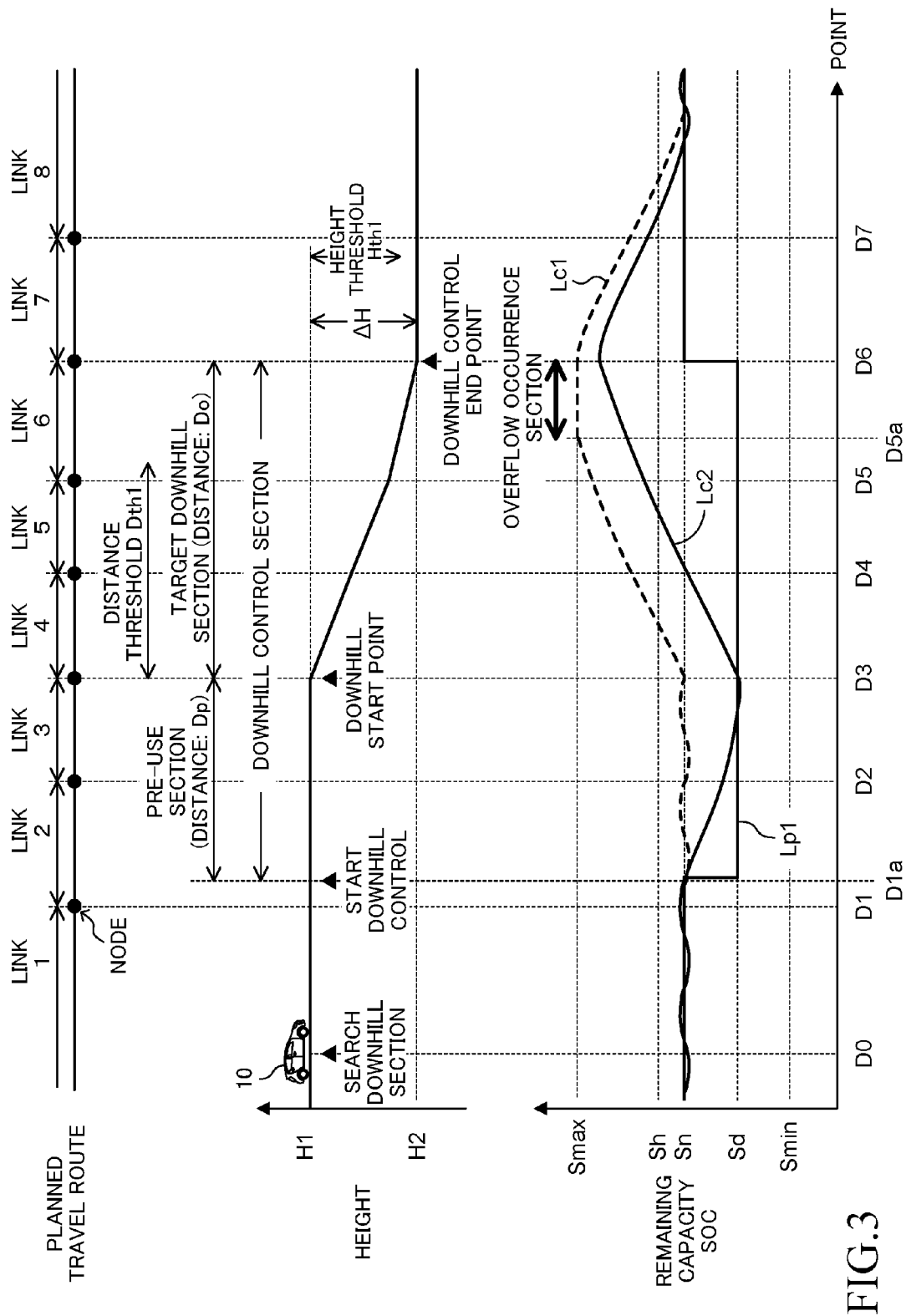
FIG. 3 is a graph which shows a change in remaining capacity when the vehicle travels through a target-downhill-section.

A change in the remaining capacity SOC at the time when the vehicle 10 travels through a downhill section will be described with reference to FIG. 3. In FIG. 3, the links defining or constituting a planned travel route of the vehicle 10 are denoted as link 1 to link 8 for convenience' sake. Each of link 1 to link 8 is a portion of an ordinary road (is not a portion of an expressway). The present position Pn is located on link 1. Link 4 to link 6 correspond to a target-downhill-section which will be described later. Meanwhile, link 1 to link 3, link 7, and link 8 correspond to flat roads. When the downhill control to be described later is not executed, the target remaining capacity SOC* is set to a standard remaining capacity Sn.

A curved line Lc1 (broken line) shows a change in the remaining capacity SOC at the time when the vehicle 10 travels from link 1 to link 8 without executing the downhill control. When the vehicle 10 travels through link 1 to link 3, the operations of the engine 23, the first motor 21, and the second motor 22 are controlled such that the remaining capacity SOC approaches the standard remaining capacity Sn which is the target remaining capacity SOC*. Therefore, the remaining capacity SOC fluctuates near the standard remaining capacity Sn. When the vehicle 10 enters a section corresponding to link 4, the remaining capacity SOC starts to increase due to regenerative braking, and when the vehicle 10 reaches a point D5a which is located midway of link 6, the remaining capacity SOC reaches the remaining capacity upper limit Smax.

Therefore, when the vehicle 10 travels between point D5a and point D6, despite the fact that the vehicle 10 travels in a downhill section, the vehicle 10 cannot perform regenerative braking. Therefore, the remaining capacity SOC cannot be increased (namely, overflow occurs), and the fuel efficiency improving effect is not attained sufficiently. In addition, if the time over which the remaining capacity SOC is maintained at a level near the remaining capacity upper limit Smax becomes long, deterioration of the storage battery 31 is accelerated.

In view of this, before the downhill section, the ECU 40 of the vehicle 10 executes "downhill control" of decreasing the target remaining capacity SOC* by a predetermined amount (electric power amount S10). When the downhill control is executed, the target remaining capacity SOC* is set to a remaining capacity (low-side remaining capacity) Sd. In the present embodiment, the magnitude of the difference between the standard remaining capacity Sn and the low-side remaining capacity Sd is equal to the electric power amount S10 which corresponds to 10% the maximum charge amount of the storage battery 31 (namely, the amount of stored electric power at the time when the remaining capacity SOC is 100%) (namely, Sd=Sn−S10).

The downhill control is started when the vehicle 10 reaches a point D1*a* which is shifted back (toward the start point of the planed travel route) from the start point D3 of the downhill section by a predetermined pre-use distance Dp. Meanwhile, the downhill control is ended when the vehicle 10 reaches the end point D6 of the downhill section, and the target remaining capacity SOC* is changed from the low-side remaining capacity Sd to the standard remaining capacity Sn. A change in the target remaining capacity SOC* in the case where the downhill control is executed is shown by a polygonal line Lp1.

A section composed of the downhill section and the "pre-use section" (between the point shifted back from the start point D3 of the downhill section by the predetermined pre-use distance Dp and the start point of the downhill section) will be also referred to as the "downhill control section." The pre-use distance Dp is a distance set in advance and is sufficiently large so that when the vehicle 10 travels over that distance, the remaining capacity SOC is gradually decreased by the electric power amount S10.

A change in the remaining capacity SOC in the case where the downhill control is executed is shown by a curved line Lc2 (continuous line). As can be understood from the curved line Lc2, when the target remaining capacity SOC* is set to the low-side remaining capacity Sd at point D1*a*, the remaining capacity SOC decreases and reaches a level near the low-side remaining capacity Sd. When the vehicle 10 travels through the downhill section after that, the remaining capacity SOC increases. However, the vehicle 10 ends the travel through the downhill section before the remaining capacity SOC reaches the remaining capacity upper limit Smax. Namely, as a result of the downhill control, occurrence of the above-described overflow can be avoided.

The downhill section which is the target of the downhill control (target-downhill-section) is a downhill section in which an increase in the remaining capacity SOC due to the above-described conversion of potential energy to electrical energy is expected to become greater than an "electric power amount S20 corresponding to 20% the maximum charge amount of the storage battery 31." The greater the average value of the vehicle speed Vs at the time when the vehicle 10 travels through the downhill section, the smaller the increase in the remaining capacity SOC during the travel through the downhill section.

More specifically, the air resistance acting on the body of the vehicle 10 is proportional to the square of the vehicle speed Vs. The greater the air resistance acting on the body of the vehicle 10, the greater the loss produced at the time of conversion from potential energy to electric energy. Therefore, in the case where the vehicle 10 travels through a downhill section in a state in which the vehicle speed Vs is high, an increase in the remaining capacity SOC becomes smaller as compared with the case where the vehicle 10 travels through the same downhill section in a state in which the vehicle speed Vs is low. In the case where a downhill section is a portion of an expressway, the vehicle speed Vs (or the average of the vehicle speed Vs) during the travel through that downhill section can be estimated to become higher as compared with the case where that downhill section is a portion of an ordinary road.

In view of this, when the travel assisting apparatus 60 (specifically, the computation section 61) searches (extracts) a target-downhill-section contained in the planned travel route of the vehicle 10, the computation section 61 uses different conditions (target downhill conditions) in order to determine whether or not a certain section is a target-downhill-section, depending on whether the planned travel route is an ordinary road or an expressway. The target-downhill-section includes an ordinary road only or an expressway only. Namely, the computation section 61 does not extract, as a single target-downhill-section, a section which includes both an ordinary road and an expressway.

In the present embodiment, the expressway is one of interstate highways, freeways and expressways (highways), and the ordinary road is one of roads other than the highways. A section (a set of links) which is the entirety or a portion of the planned travel route of the vehicle 10 and for which a judgment as to whether or not it is a target-downhill-section is made will be also referred to as a "section to be judged."

One or a plurality of links which constitute a section to be judged are each classified as a "downward gradient link" or a "flat link." A downward gradient link on an ordinary road is a downhill section in which the average gradient of the link is greater than a gradient represented by a gradient threshold degth1 (degth1<0) (namely, a downhill section whose gradient is greater than the gradient threshold degth1). A flat link on an ordinary road is a downhill section in which the average gradient of the link is less than the gradient represented by the gradient threshold degth1, a flat section, or an uphill section.

A downward gradient link on an expressway is a downhill section in which the average gradient of the link is greater than a gradient represented by a gradient threshold degth2 (degth2<degth1) (namely, a downhill section whose gradient is greater than the gradient threshold degth2). A flat link on an express road is a downhill section in which the average gradient of the link is less than the gradient represented by the gradient threshold degth2, a flat section, or an uphill section.

The gradient threshold degth1 and the gradient threshold degth2 are predetermined values. The gradient threshold degth1 is set such that when the travel route of the vehicle 10 is a downhill section of an ordinary road whose gradient is greater than the gradient threshold degth1, the amount of energy converted from the above-described potential energy to electrical energy increases to some extent. Similarly, the gradient threshold degth2 is set such that when the travel route of the vehicle 10 is a downhill section of an expressway whose gradient is greater than the gradient threshold degth2, the amount of energy converted from the above-described potential energy to electrical energy increases to some extent. As described above, in the case where the vehicle 10 travels on an expressway, the vehicle speed Vs is higher as compared with the case where the vehicle 10 travels on an ordinary road, and the air resistance acting on the body of the vehicle 10 is likely to become larger. Therefore, the absolute value of the gradient threshold degth2 is greater than the absolute value of the gradient threshold degth1 (namely, degth2<degth1<0).

The target downhill conditions used when the section to be judged is an ordinary road (ordinary road target downhill conditions) are as follows.

(a1) The section to be judged is a section constituted by an ordinary road only.

(b1) Its start link and end link are downward gradient links (namely, downhill sections whose gradients are greater than the gradient threshold degth1).

(c) The distance between the start point and the end point is greater than a distance threshold Dth.

(d1) The height of the end point is lower than the height of the start point, and the height difference is greater than a height difference threshold Hth1 (Hth1>0).

(e) The distance of continuous flat link sections contained in the section to be judged is less than a flat distance threshold Fth (Fth<Dth).

Meanwhile, the target downhill conditions used when the section to be judged is an expressway (expressway target downhill conditions) are as follows.

(a2) The section to be judged is a section constituted by an expressway only.
(b2) Its start link and end link are downward gradient links (namely, downhill sections whose gradients are greater than the gradient threshold degth2).
(c) The distance between the start point and the end point is greater than the distance threshold Dth.
(d2) The height of the end point is lower than the height of the start point, and the height difference is greater than a height difference threshold Hth2 (Hth2>Hth1).
(e) The distance of continuous flat link sections contained in the section to be judged is less than the flat distance threshold Fth.

In the example of FIG. 3, a downhill section constituted by link 4 to link 6 (namely, a section from point D3 to point D6) is a target-downhill-section. More specifically, each of link 4 to link 6 is a portion of an ordinary road. The start link (link 4) and the end link (link 6) are downhill sections whose gradients are greater than the gradient threshold degth1. The distance Do from point D3 to point D6 is greater than the distance threshold Dth (namely, Do=D6−D3>Dth). The height H2 of point D6 is lower than the height H1 of point D3, and the height difference ΔH is greater than the height difference threshold Hth1 (namely, ΔH=H1−H2>Hth1).

Since each of link 4 to link 6 is a downward gradient link and is not a flat link, the distance of flat links contained in the section to be judged is "0", and is less than the flat distance threshold Fth. Accordingly, the section (section to be judged) constituted by link 4 to link 6 satisfies all the above-described ordinary road target downhill conditions (namely; the conditions (a1), (b1), (c), (d1), and (e)), and is therefore a target-downhill-section.

Notably, as described above, the length and gradient of each link are stored in the map database. Therefore, the computation section 61 obtains the height difference between one end and the other end of each link by calculating the product of the length and gradient of the link. Further, the computation section 61 obtains the height difference between one end and the other end of a certain section by calculating the sum of the height differences of a plurality of links which constitute the certain section. Notably, in the case where the map database contains the heights of opposite ends of each link, the height difference of each link is obtained by subtracting the height of the start point of the link from the height of the end point of the link.

Figure 4:
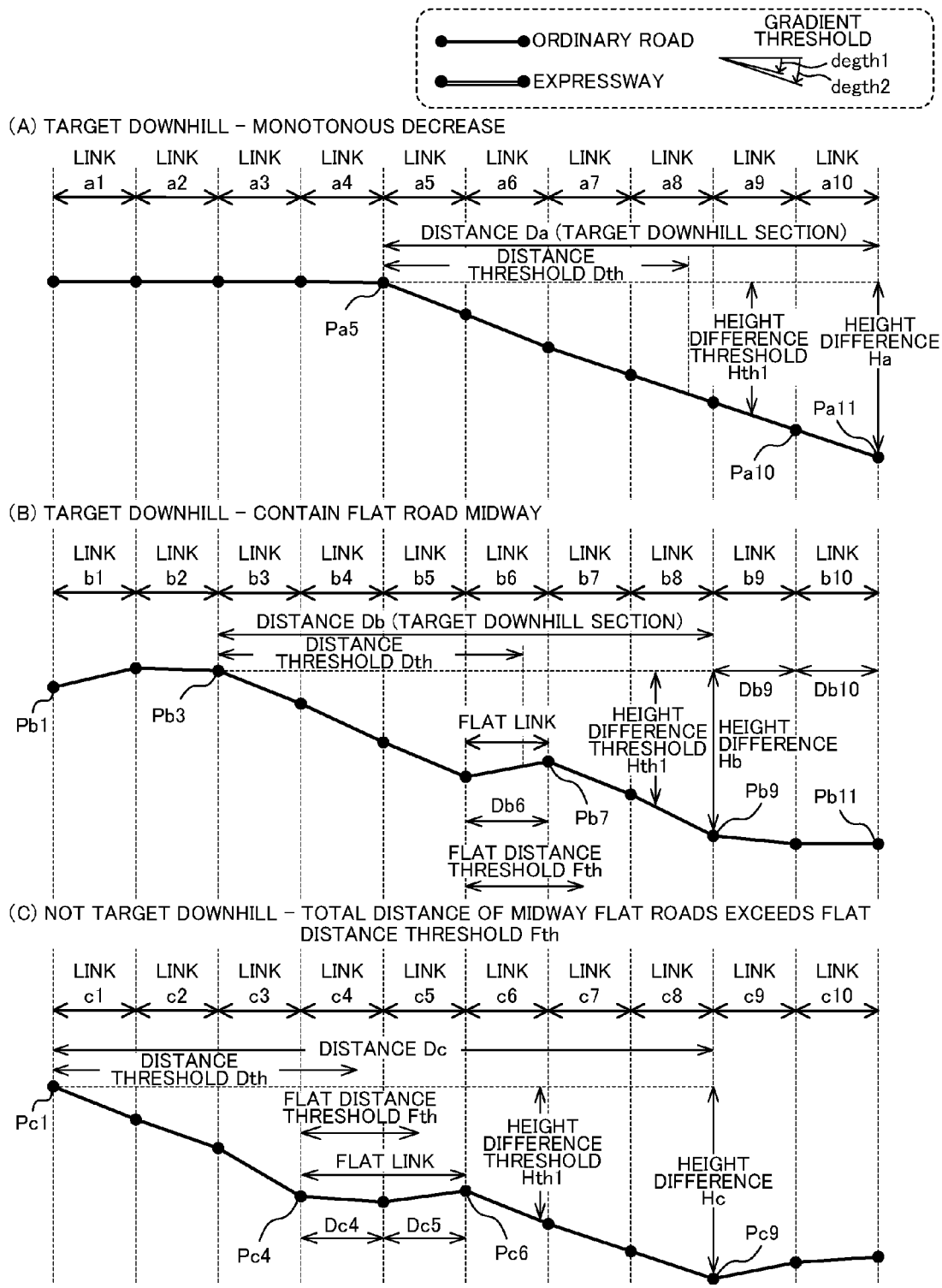
FIG. 4 is an illustration which shows examples of a downhill section which satisfies the conditions for target-downhill-sections and an example of a downhill section which does not satisfy the conditions for the target downhill sections.

(A) and (B) of FIG. 4 show other exemplary target-downhill-sections on an ordinary road. (A) of FIG. 4 shows a planned travel route of the vehicle 10 which is constituted by 10 links (link a1 to link a10). Each of link a1 to link a10 is a portion of an ordinary road. Link a1 to link a4 are flat links. Meanwhile, each of link a5 to link a10 is a downward gradient link. The total distance Da of a section represented by link a5 to link a10 is greater than the distance threshold Dth.

The height of the end point Pa11 of link a10 is lower than the height of the start point Pa5 of link a5, and its height difference (absolute value) Ha is greater than the height difference threshold Hth1. Since each of link a5 to link a10 is a downward gradient link and is not a flat link, the flat link distance is "0" and is less than the flat distance threshold Fth. Accordingly, the section of link a5 to link a10 satisfies all the above-described conditions (a1), (b1), (c), (d1), and (e). Therefore, these links constitute a target-downhill-section. Namely, the section from point Pa5 to point Pa11 is a target-downhill-section.

For example, when link a4 to link a10 are considered as a section to be judged, the section to be judged does not satisfy the above-described condition (b1) because link a4 is a flat link. Therefore, the section of link a4 to link a10 is not a target-downhill-section.

(B) of FIG. 4 shows a planned travel route of the vehicle 10 which is constituted by 10 links (link b1 to link b10). Each of link b1 to link b10 is a portion of an ordinary road. Link b3 to link b5 and link b7 to link b8 are downward gradient links. Meanwhile, link b1 to link b2, link b6, and link b9 to link b10 are flat links.

The total distance Db of a section represented by link b3 to link b8 is greater than the distance threshold Dth. The height of the end point Pb9 of link b8 is lower than the height of the start point Pb3 of link b3, and its height difference (absolute value) Hb is greater than the height difference threshold Hth1. Therefore, the above-described conditions (a1), (b1), (c), and (d1) are satisfied.

Although the section of link b3 to link b9 includes flat link b6, since the distance Db6 between the start point and end point of link b6 is less than the flat distance threshold Fth, the above-described condition (e) is satisfied. Accordingly, the section of link b3 to link b8 constitutes a target-downhill-section.

(C) of FIG. 4 shows an example of a set of links which do not satisfy the ordinary road target downhill conditions. (C) of FIG. 4 shows a planned travel route of the vehicle 10 which is constituted by 10 links (link c1 to link c10). Each of link c1 to link c10 is a portion of an ordinary road. Link c1 to link c3 and link c6 to link c8 are downward gradient links. Meanwhile, link c4 to link c5 and link c9 to link c10 are flat links.

For example, when link c1 to link c8 are considered as a section to be judged, the total distance Dc of the section represented by link c1 to link c8 is greater than the distance threshold Dth. The height of the end point Pc9 of link c8 is lower than the height of the start point Pc1 of link c1, and its height difference (absolute value) Hc is greater than the height difference threshold Hth1. Therefore, the above-described conditions (a1), (b1), (c), and (d1) are satisfied.

However, the section of link c1 to link c8 includes flat link c4 and flat link c5. Since the distance (distance Dc4+ distance Dc5) from the start point Pc4 of link c4 to the end point Pc6 of link c5 is greater than the flat distance threshold Fth, the above-described condition (e) is not satisfied. Accordingly, the section of link c1 to link c8 does not constitute a target-downhill-section.

Figure 5:
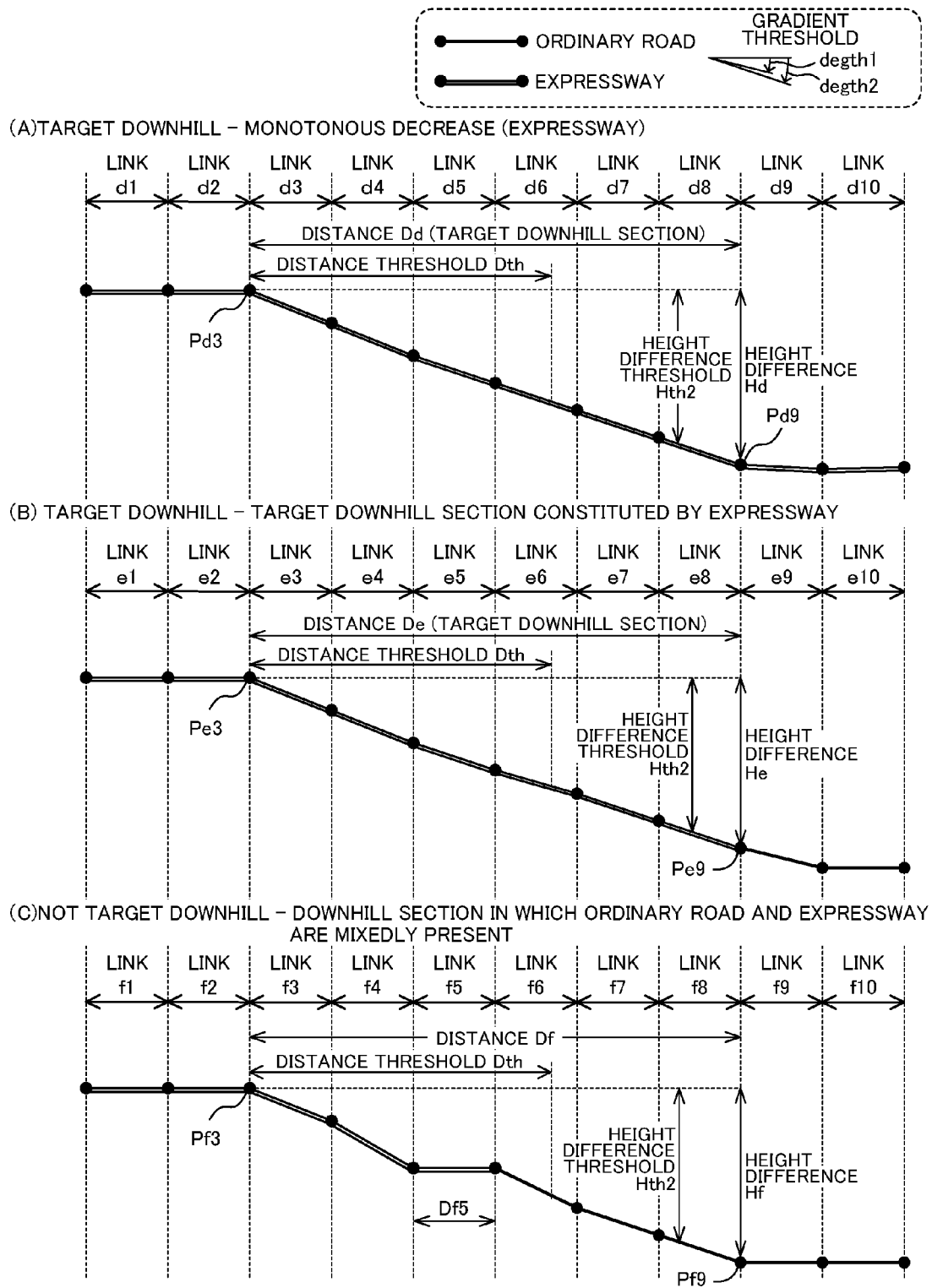
FIG. 5 is an illustration which shows examples of a downhill section which satisfies the conditions for target-downhill-sections and an example of a downhill section which does not satisfy the conditions for target downhill sections.

(A) and (B) of FIG. 5 show exemplary target-downhill-sections on an expressway. (A) of FIG. 5 shows a planned travel route of the vehicle 10 which is constituted by 10 links (link d1 to link d10). Each of link d1 to link d10 is a portion of an expressway. Link d3 to link d8 are downward gradient links. Meanwhile, link d1 to link d2 and link d9 to link d10 are flat links.

The total distance Dd of a section represented by link d3 to link d8 is greater than the distance threshold Dth. The height of the end point Pd9 of link d8 is lower than the height of the start point Pd3 of link d3, and its height difference (absolute value) Hd is greater than the height difference threshold Hth2. Link d3 to link d8 include no flat link. Accordingly, the section of link d3 to link d8 satisfies all the above-described conditions (a2), (b2), (c), (d2), and (e). Therefore, these links constitute a target-downhill-section.

(B) of FIG. 5 shows a planned travel route of the vehicle 10 which is constituted by 10 links (link e1 to link e10). Each of link e1 to link e8 is a portion of an expressway. Meanwhile, each of link e9 to link e10 is a portion of an ordinary road. Link e3 to link e9 are downward gradient links. Meanwhile, link e1 to link e2 and link e10 are flat links.

The total distance De of a section represented by link e3 to link e8 is greater than the distance threshold Dth. The height of the end point Pe9 of link e8 is lower than the height of the start point Pe3 of link e3, and its height difference (absolute value) He is greater than the height difference threshold Hth2. Link e3 to link e8 include no flat link. Accordingly, the section of link e3 to link e8 satisfies all the above-described conditions (a2), (b2), (c), (d2), and (e). Therefore, these links constitute a target-downhill-section.

For example, when link e3 to link e9 are considered as a section to be judged, the above-described conditions (b2), (c), (d2), and (e) are satisfied. However, since the section of link e3 to link e9 includes an ordinary road (link e9), the above-described condition (a2) is not satisfied. Accordingly, the section of link e1 to link e9 does not constitute a target-downhill-section.

(C) of FIG. 5 shows an example of a set of links which satisfy neither the ordinary road target downhill conditions nor the expressway target downhill conditions. (C) of FIG. 5 shows a planned travel route of the vehicle 10 which is constituted by 10 links (link f1 to link f10). Each of link f1 to link f5 is a portion of an expressway. Meanwhile, each of link f6 to link f10 is a portion of an ordinary road. Link f3 to link f4 and link f6 to link f8 are downward gradient links. Meanwhile, link f1 to link f2, link f5, and link f9 to link f10 are flat links.

For example, when link f3 to link f8 are considered as a section to be judged, the start link (link f3) and the end link (link f8) are downward gradient links. The total distance Df of the section represented by link f3 to link f8 is greater than the distance threshold Dth. The height of the end point Pf9 of link f8 is lower than the height of the start point Pf3 of link f3, and its height difference is greater than the height difference threshold Hth2. The distance Df5 of a flat section contained in link f3 to link f8 is less than the flat distance threshold Fth.

Accordingly, the section of link f3 to link f8 satisfies the above-described conditions (b2), (c), (d2), and (e). However, since an ordinary road and an expressway are mixedly present in the section of link f3 to link f8, the above-described condition (a2) is not satisfied. Accordingly, the section of link f3 to link f8 does not satisfy the expressway target downhill conditions. In addition, since the section of link f3 to link f8 does not satisfy the above-described condition (a1), the section of link f3 to link f8 does not satisfy the ordinary road target downhill conditions.

Target-downhill-sections are extracted in the above-described manner, and the downhill control is executed for the extracted target-downhill-sections.

(Provision of Information from Travel Assisting Apparatus to ECU)

The computation section 61 searches target-downhill-sections contained in a route from the present position Pn to a destination (namely, a planned travel route) in accordance with the above-described ordinary road target downhill conditions and the above-described expressway target downhill conditions. In the case where a target-downhill-section is found, when the vehicle 10 reaches the start point of the downhill control section (the start point of the pre-use section), the computation section 61 sends to the ECU 40 a notice which indicates that the downhill control must be started. The ECU 40 starts the downhill control in response to that notice from the computation section 61.

After that, when the vehicle 10 reaches the end point of the downhill control section (the end point of the target-downhill-section), the computation section 61 sends to the ECU 40 an notice which indicates that the downhill control must be ended. The ECU 40 ends the downhill control in response to that notice from the computation section 61.

(Specific Operation)

Next, specific operation of the ECU 40 will be described.
<Control of Drive Force by ECU>

As described above, the first control apparatus changes the target remaining capacity SOC* in the downhill control. First, the way in which the operations of the engine 23, the first motor 21, and the second motor 22 are changed as a result of a change in the target remaining capacity SOC* will be described by using a drive force control routine.

Figure 6:
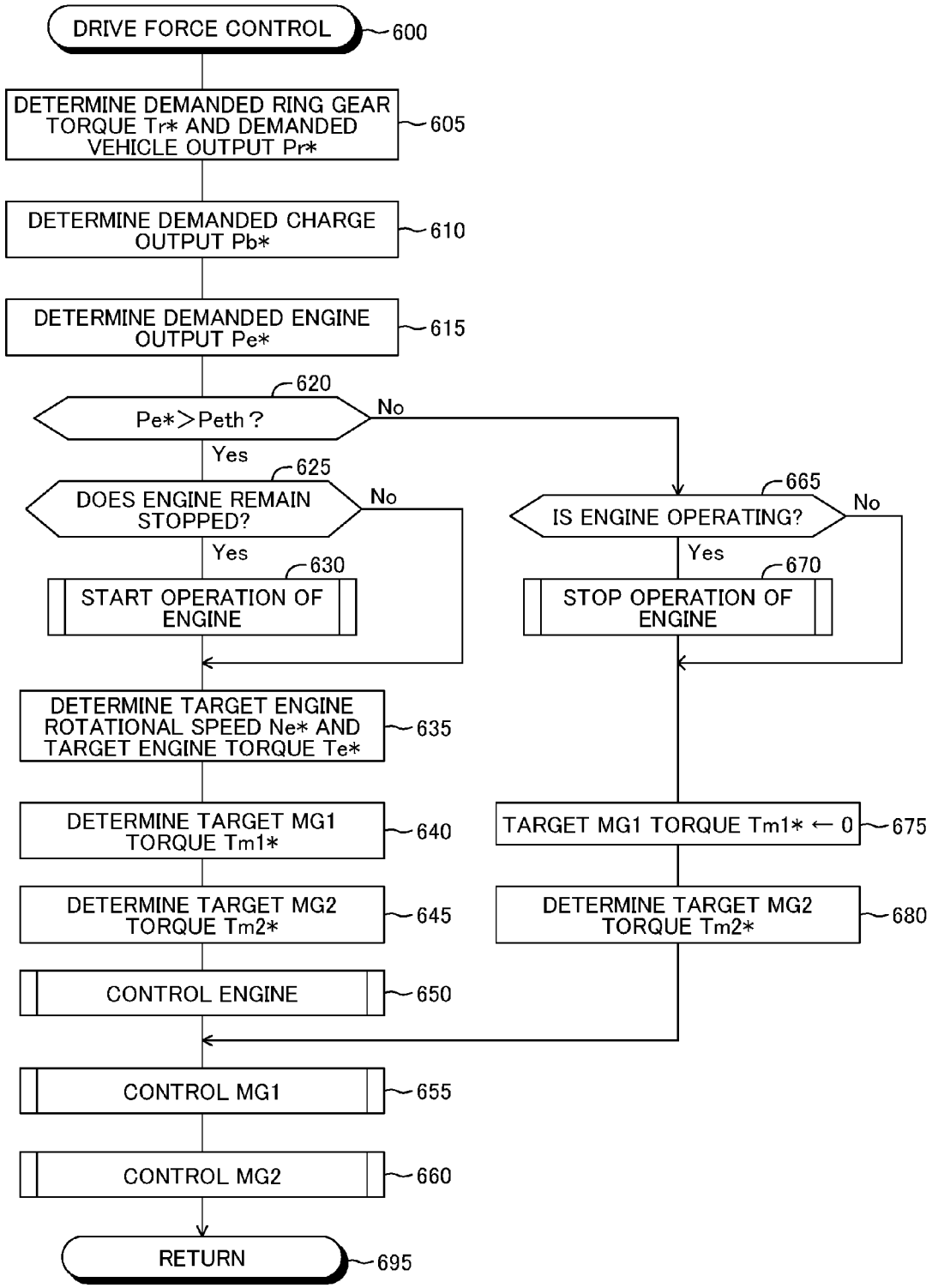
FIG. 6 is a flowchart showing drive force control processing executed by the first control apparatus.

The CPU 41 of the ECU 40 (hereinafter also referred to as the "CPU" for simplicity) executes the "drive force control routine" represented by the flowchart of FIG. 6 every time a predetermined period of time elapses. Accordingly, when a proper timing comes, the CPU starts the processing from step 600 of FIG. 6, successively performs the processings of step 605 to step 615 which will be described later, and proceeds to step 620.

Figure 7:
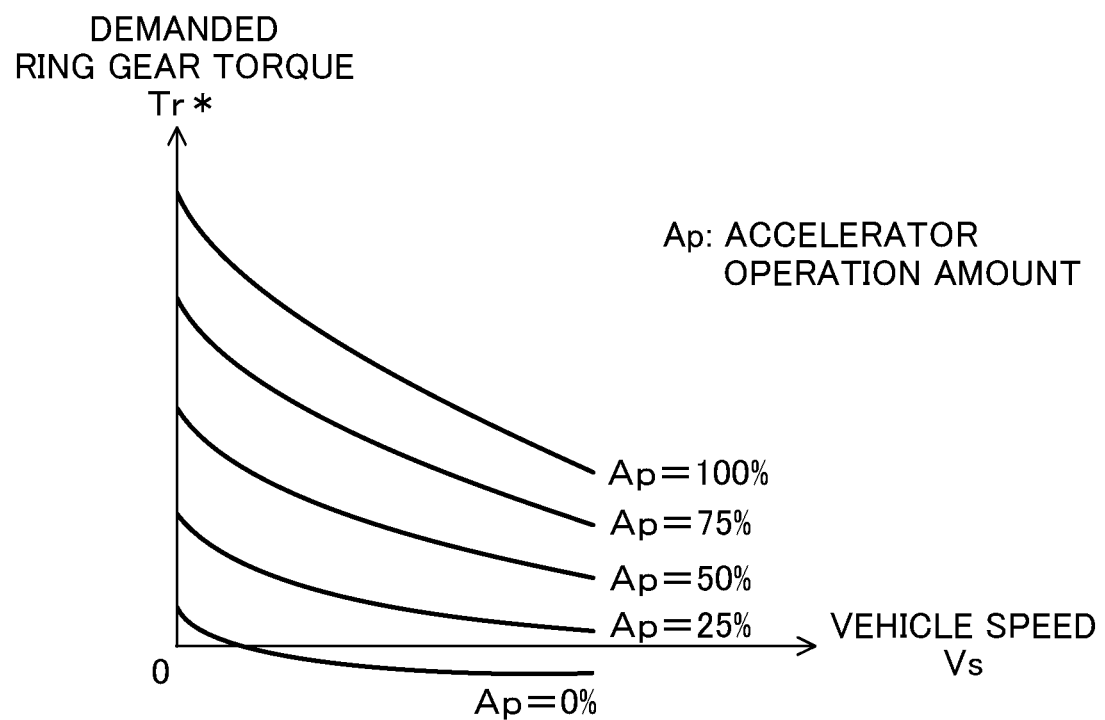
FIG. 7 is a graph showing the relation between vehicle speed and accelerator operation amount, and demanded ring gear torque.

Step 605: The CPU determines a demanded ring gear torque Tr* by applying the accelerator operation amount Ap and the vehicle speed Vs to a "lookup table which defines the relation between the accelerator operation amount Ap and the vehicle speed Vs, and the demanded ring gear torque Tr*" shown in FIG. 7. The demanded ring gear torque Tr* is proportional to the torque acting on the drive wheels 27 which the driver requests the vehicle 10 to produce. Further, the CPU calculates, as a demanded vehicle output Pr*, the product of the demanded ring gear torque Tr* and the ring gear rotational speed Nr (Pr*=Tr*×Nr). The ring gear rotational speed Nr is proportional to the vehicle speed Vs.

Step 610: The CPU determines a demanded charge output Pb* on the basis of a remaining capacity difference ΔSOC which is the difference between the target remaining capacity SOC* and the actual remaining capacity SOC calculated separately (i.e., ΔSOC=SOC−SOC*). More specifically, the CPU determines the demanded charge output Pb* by applying the remaining capacity difference ΔSOC to a "lookup table which defines the relation between the remaining capacity difference ΔSOC and the demanded charge output Pb*" shown in FIG. 8.

Figure 8:
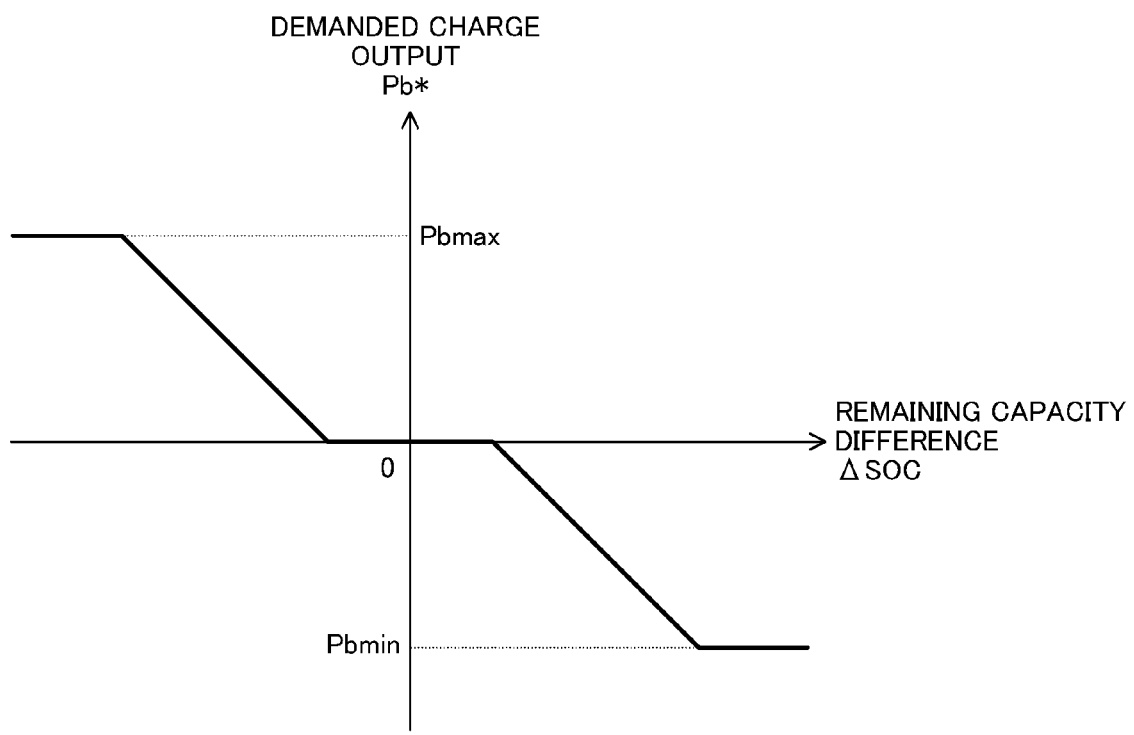
FIG. 8 is a graph showing the relation between remaining capacity difference and demanded charge output.

As can be understood from FIG. 8, the greater the remaining capacity difference ΔSOC, the smaller the value to which the demanded charge output Pb* is set. Accordingly, in the case where the actual remaining capacity SOC is at a certain level, when the target remaining capacity SOC* is decreased, the remaining capacity difference ΔSOC increases, whereby the demanded charge output Pb* decreases. The upper limit of the demanded charge output Pb* is Pbmax (Pbmax>0), and the lower limit of the set demanded charge output Pb* is Pbmin (Pbmin<0). Notably, irrespective of whether or not the downhill control is executed and irrespective of the value of the remaining capacity difference ΔSOC, the demanded charge output Pb* is set to the lower limit Pbmin when the remaining capacity SOC is equal to or greater than the remaining capacity upper limit Smax, and the demanded charge output Pb* is set to the upper limit Pbmax when the remaining capacity SOC is equal to or less than the remaining capacity lower limit Smin.

Step 615: The CPU calculates a demanded engine output Pe* by adding a loss Ploss to the sum of the demanded vehicle output Pr* and the demanded charge output Pb* (i.e., Pe*=Pr*+Pb*+Ploss).

Next, the CPU proceeds to step 620 and judges whether or not the demanded engine output Pe* is greater than an output threshold Peth. The output threshold Peth is set to a value determined such that when the engine 23 is operated to produce an output equal to or less than the output threshold Peth, the operation efficiency of the engine 23 becomes lower than a predetermined efficiency. In addition, the output threshold Peth is set such that when the demanded charge output Pb* is set to the upper limit Pbmax, the demanded engine output Pe* becomes greater than the output threshold Peth.

(Case 1: Pe*>Peth)

In the case where the demanded engine output Pe* is greater than the output threshold Peth, the CPU makes an affirmative judgment (Yes) in step 620 and proceeds to step 625. In step 625, the CPU judges whether or not the engine 23 is in a stopped state at the present. In the case where the engine 23 is in the stopped state, the CPU makes an affirmative judgment (Yes) in step 625 and proceeds to step 630. In step 630, the CPU executes processing of starting the operation of the engine 23. Subsequently, the CPU proceeds to step 635. Meanwhile, in the case where the engine 23 is being operated, the CPU makes a negative judgment (No) in step 625 and proceeds directly to step 635.

The CPU successively performs the processings of step 635 to step 660 which will be described later. After that, the CPU proceeds to step 695 and ends the present routine temporarily.

Step 635: The CPU determines a target engine rotational speed Ne* and a target engine torque Te* such that an output equal to the demanded engine output Pe* is output from the engine 23 and the operation efficiency of the engine 23 becomes the highest. Namely, the CPU determines the target engine rotational speed Ne* and the target engine torque Te* on the basis of the optimum engine operation point corresponding to the demanded engine output Pe*.

Step 640: The CPU calculates a target MG1 rotational speed Nm1* by substituting the ring gear rotational speed Nr and the target engine rotational speed Ne* into the above-described expression (1). Further, the CPU determines a target first motor torque (target MG1 torque) Tm1* which realizes the target MG1 rotational speed Nm1*.

Step 645: The CPU calculates a shortage torque which is the difference between the demanded ring gear torque Tr* and a torque which acts on the ring gear when the engine 23 generates a torque equal to the target engine torque Te*. Further, the CPU calculates a target second motor torque (target MG2 torque) Tm2* which is a torque to be generated by the second motor 22 so as to supplement the shortage torque.

Step 650: The CPU controls the engine 23 in such a manner that the engine torque Te generated by the engine 23 becomes equal to the target engine torque Te* and the engine rotational speed NE becomes equal to the target engine rotational speed Ne*.

Step 655: The CPU controls the first inverter 33 in such a manner that the torque Tm1 generated by the first motor 21 becomes equal to the target MG1 torque Tm1*.

Step 660: The CPU controls the second inverter 34 in such a manner that the torque Tm2 generated by the second motor 22 becomes equal to the target MG2 torque Tm2*.

(Case 2: Pe*≤Peth)

In the case where the demanded engine output Pe* is equal to or less than the output threshold Peth, when the CPU proceeds to step 620, the CPU makes a negative judgment (No) in step 620 and proceeds to step 665 so as to judge whether or not the engine 23 is being operated at the present.

In the case where the engine 23 is being operated, the CPU makes an affirmative judgment (Yes) in step 665 and proceeds to step 670 so as to execute processing of stopping the operation of the engine 23. After that, the CPU proceeds to step 675. Meanwhile, in the case where the engine 23 is in the stopped state, the CPU makes a negative judgment (No) in step 665 and proceeds directly to step 675.

In step 675, the CPU sets the value of the target MG1 torque Tm1* to "0." Further, the CPU proceeds to step 680 and calculates the target MG2 torque Tm2* which is the torque to be generated by the second motor 22 so as to make the torque acting on the ring gear equal to the demanded ring gear torque Tr*. Subsequently, the CPU proceeds to step 655 to step 660.

The engine 23, the first motor 21, and the second motor 22 are controlled in the above-described manner.

(Specific Operation—Search of Target-Downhill-Section by Travel Assisting Apparatus)

Next, specific operation of the travel assisting apparatus 60 will be described.

Figure 9:
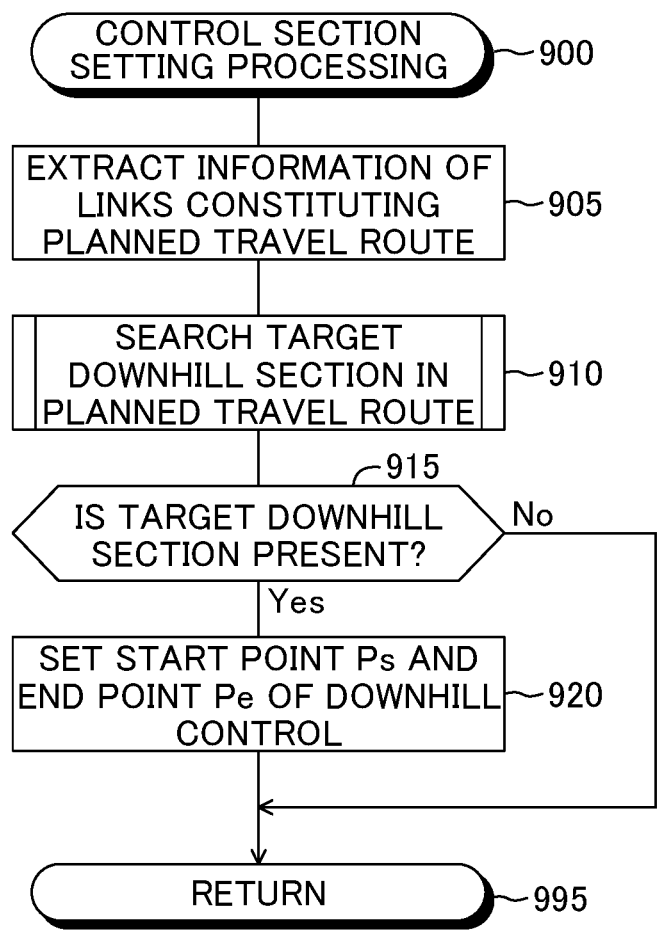
FIG. 9 is a flowchart showing control section setting processing executed by the first control apparatus.

The CPU 66 of the computation section 61 executes a "control section setting processing routine" represented by the flowchart of FIG. 9 when the driver enters a destination and when the vehicle 10 passes through the end point of a target-downhill-section searched already.

Accordingly, when a proper timing comes, the CPU 66 starts the processing from step 900 of FIG. 9 and proceeds to step 905 so as to extract, from the map database, a planned travel route (a combination of links) extending from the present position Pn to the destination. Notably, in the case where the present routine is executed for the first time after the entry of the destination, the CPU 66 determines a planned travel route on the basis of the present position Pn and the destination and extracts a combination of links of the planned travel route.

Subsequently, the CPU 66 proceeds to step 910 and searches the closet target-downhill-section located forward of a point on the planned travel route which is separated from the present position Pn by the pre-use distance Dp. The details of target-downhill-section search processing will be described later. Subsequently, the CPU 66 proceeds to step 915 and determines whether or not the result of the search in step 910 shows that a target-downhill-section is present.

In the case where a target-downhill-section is present, the CPU 66 makes an affirmative judgment (Yes) in step 915 and proceeds to step 920. In step 920, the CPU 66 sets, as the start point Ps of the downhill control, a point on the planned travel route which is shifted back from the start point of the target-downhill-section by the pre-use distance Dp. In addition, the CPU 66 sets the end point of the target-downhill-section as the end point Pe of the downhill control. The set start point Ps and the set end point Pe are stored in the RAM 68. Subsequently, the CPU 66 proceeds to step 995 and ends the present routine.

Notably, in the case where no target-downhill-section is present, the CPU 66 makes a negative judgment (No) in step 915 and proceeds directly to step 995.

Figure 10:
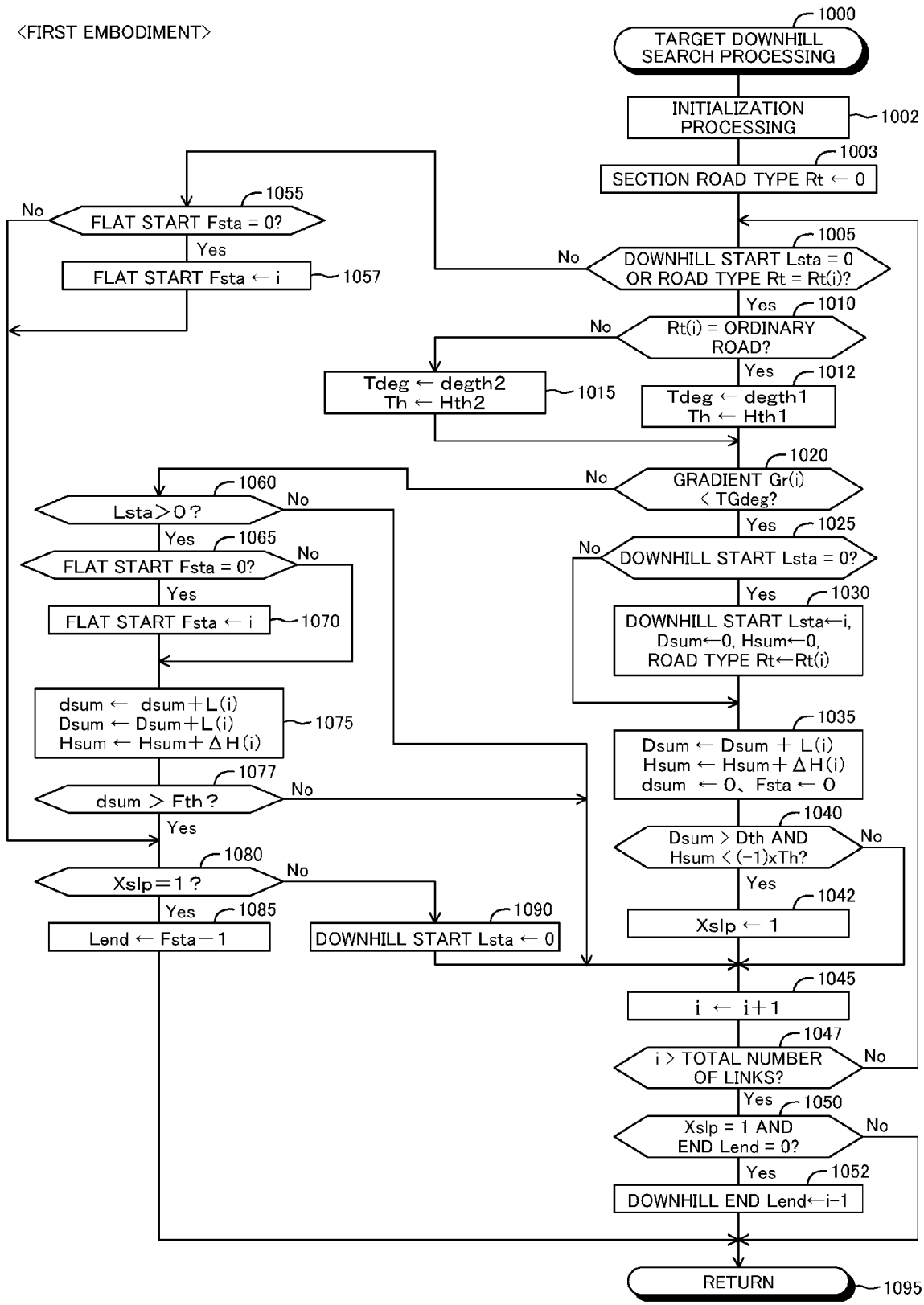
FIG. 10 is a flowchart showing target downhill search processing executed by the first control apparatus.

When the CPU 66 searches a target-downhill-section by the processing of step 910 of FIG. 9, the CPU 66 executes a "target downhill search processing routine" represented by the flowchart of FIG. 10. When the CPU 66 has succeeded in searching a target-downhill-section, the CPU 66 ends the present routine (the routine of FIG. 10) at that point in time and proceeds to step 915. Also, when the CPU 66 finds that no target-downhill-section is contained in the planned travel route, the CPU 66 ends the present routine and proceeds to step 915.

More specifically, when the CPU 66 executes the present routine, the CPU 66 investigates each of searched links which are obtained by extracting links, in the order in which the vehicle 10 travels through the links, the links being located forward of a point on the planned travel route which is separated from the present position Pn by the pre-use distance Dp. When the CPU 66 finds that a certain link is the end link of the target-downhill-section, the CPU 66 ends the present routine at that point in time. When the CPU 66 cannot find a target-downhill-section even after it investigates the final link of the planned travel route, the CPU 66 ends the present routine at that point in time.

For such an operation, the CPU 66 sets a variable i which represents a link (investigated link) which is investigated at that point in time. The CPU 66 sets the value of the variable i to "1" when it starts the present routine. The CPU 66 increases the value of the variable i by "1" every time the next link (an adjacent link more remote from the vehicle 10) becomes the investigated link. The CPU 66 ends the present routine if the CPU 66 cannot find a target-downhill-section even after the value of the variable i becomes a value corresponding to the last link of the planned travel route.

In the following description, a link corresponding to the value of the variable i (i.e., the i-th searched link) will also be referred to as the "i-th link" for simplicity. In addition, "link number" is used in order to specify the investigated link in the present routine. For example, the link number of a link which is investigated third in the present routine is "3." In addition, in the present routine, a section which is possibly a target-downhill-section will be also referred to as a "candidate section."

During execution of the present routine, the CPU 66 sets the link number of the start link (a link closest to the vehicle 10) of a candidate section at that point in time as the value of a candidate section start link Lsta, and sets the link number of the end link (a link farthest from the vehicle 10) of the candidate section at that point in time as the value of a candidate section end link Lend. When the value of the candidate section start link Lsta is "0," it means that any candidate section is not present (is not found) at that point in time.

When a candidate section is present, the CPU 66 sets the "distance of the candidate section at that point in time" as the value of a candidate section total distance Dsum, and sets the "height difference between the start point and end point of the candidate section at that point in time" as the value of a candidate section total height difference Hsum. In the case where the end point of the candidate section is lower than the start point of the candidate section, the value of the candidate section total height difference Hsum becomes negative (i.e., Hsum<0).

In the case where the candidate section contains a flat link (flat section), the CPU 66 sets the "link number of the first link of the flat section" as the value of a flat section start link Fsta, and sets the "length of the flat section at that point in time" as the value of a flat section total distance dsum.

In the case where the candidate section satisfies the ordinary road target downhill conditions or the expressway target downhill conditions, the CPU 66 sets a target-downhill-section extraction flag Xslp to "1." In the case where the candidate section end link at this point in time is not the end link of the planned travel route, the CPU 66 judges whether or not the ordinary road target downhill conditions or the expressway target downhill conditions are satisfied even when the next link is added to the candidate section.

In the case where the value of the target-downhill-section extraction flag Xslp has already been set to "1" when the flat section total distance dsum becomes greater than the flat distance threshold Fth, the CPU 66 extracts, as a target-downhill-section, a "section of the candidate section at that point in time which is located before the flat section start link Fsta." In the case where the value of the target-downhill-section extraction flag Xslp is "0" when the flat section total distance dsum becomes greater than the flat distance threshold Fth, the CPU 66 sets the value of the candidate section start link Lsta to "0" and starts searching of a new candidate section.

In addition, the CPU 66 sets, as the value of a candidate section road type Rt, a value corresponding to the road type of the candidate section at that point in time (either of an ordinary road and an expressway). Specifically, in the case where the candidate section is constituted by an ordinary road, the CPU 66 sets the value of the candidate section road type Rt to "1." Meanwhile, in the case where the candidate section is constituted by an expressway, the CPU 66 sets the value of the candidate section road type Rt to "2."

In the case where a candidate section is present, if the road type of a "link following the candidate section (i.e., a link following the end link of the candidate section at that point in time) differs from the road type of the link which constitutes the candidate section, the "link following the candidate section" is treated in the same manner as the above-described flat section whose length is greater than the flat distance threshold Fth. Specifically, when the value of the target-downhill-section extraction flag Xslp is "1" at that time, the CPU 66 extracts, as a target-downhill-section, the candidate section at that point in time. Meanwhile, when the value of the target-downhill-section extraction flag Xslp is "0," the CPU 66 sets the value of the candidate section start link Lsta to "0" and starts searching of a new candidate section.

When a proper timing comes, the CPU 66 starts the processing from step 1000 of FIG. 10 and proceeds to step 1002 so as to execute initialization processing. More specifically, the CPU 66 obtains searched links by extracting links, in the order in which the vehicle 10 travels through the links, the links being located forward of a point on the planned travel route which is separated from the present position Pn by the pre-use distance Dp. Further, the CPU 66 sets the value of the variable i to "1."

In addition, the CPU 66 sets the values of the candidate section total distance Dsum, the candidate section total height difference Hsum, the flat section total distance dsum, the flat section start link Fsta, the candidate section start link Lsta, the candidate section end link Lend, and the target-downhill-section extraction flag Xslp to "0." Subsequently, the CPU 66 proceeds to step 1003 and sets the value of the candidate section road type Rt to "0."

(Case 1) Case where Downhill Section Contains Flat Link

This case will be described with reference to an example shown in (B) of FIG. 4. In this case, after the processing of step 1003, the CPU 66 proceeds to step 1005 and judges whether or not the value of the candidate section start link Lsta is "0" or the candidate section road type Rt is the same as the road type Rt(i) of the i-th link.

When step 1005 is executed for the first time, since the candidate section road type Rt is "0," it differs from the road type Rt(1) of the first link (in this case, "1" representing an ordinary road). However, the value of the candidate section start link Lsta is "0." Therefore, the CPU 66 makes an affirmative judgment (Yes) in step 1005 and proceeds to step 1010 so as to judge whether or not the road type Rt(i) is an ordinary road. Since link b1 is an ordinary road as described above, the CPU 66 makes an affirmative judgment (Yes) in step 1010 and proceeds to step 1012. In step 1012, the CPU 66 sets the value of a gradient threshold Tdeg to a gradient threshold degth1 and sets the value of a height difference threshold Th to the height difference threshold Hth1.

Subsequently, the CPU 66 proceeds to step 1020 and judges whether or not the average gradient Gr(i) of the i-th link is less than the gradient threshold Tdeg (namely, whether or not this link is a downward gradient link). In the case where step 1020 is executed for the first time, since the value of the variable i is "1," the CPU 66 judges whether or not link b1 (namely, the first link) of (B) of FIG. 4 is a downward gradient link. Since link b1 is a flat link (specifically, an uphill section), the CPU 66 makes a negative judgment (No) in step 1020 and proceeds to step 1060.

In step 1060, the CPU 66 judges whether or not the value of the candidate section start link Lsta is greater than "0." Since the value of the candidate section start link Lsta is "0" at the present, the CPU 66 makes a negative judgment (No) in step 1060, proceeds to step 1045, and adds "1" to the value of the variable i.

Subsequently, the CPU 66 proceeds to step 1047 and judges whether or not the value of the variable i is greater than the total number of the links which constitute a searched link (in the present example, the CPU 66 judges whether or not the value of the variable i is greater than "10"). Since the value of the variable i is "2" at the present, the value of the variable i is smaller than the total number of the links. Accordingly, the CPU 66 makes a negative judgment (No) in step 1047 and proceeds to step 1005.

At this time (namely, when the CPU 66 executes step 1005 for the second time), the value of the candidate section start link Lsta is "0" (although the value of the candidate section road type Rt is "0" and differs from the road type Rt(2) (in this case, "1" representing an ordinary road)). Therefore, the CPU 66 makes an affirmative judgment (Yes) in step 1005. Subsequently, the CPU 66 executes the processings of step 1010 to step 1012, step 1020, step 1060, step 1045 to step 1047, and step 1005 to step 1012, and proceeds to step 1020.

At this time, the value of the variable i is "3" and the third link (i.e., link b3) is a downward gradient link (namely, link b3 is a downhill whose gradient is greater than the gradient threshold Tdeg (in this case, the gradient threshold degth1)). Accordingly, the CPU 66 makes an affirmative judgment (Yes) in step 1020 and proceeds to step 1025 so as to judge whether or not the value of the candidate section start link Lsta is "0."

Since the value of the candidate section start link Lsta is "0" at the preset, the CPU 66 makes an affirmative judgment (Yes) in step 1025 and proceeds to step 1030. In step 1030, the CPU 66 sets the value of the candidate section start link Lsta to the value of the variable i (in this case, "3"). In addition, the CPU 66 sets the value of the candidate section total distance Dsum to "0" and sets the value of the candidate section total height difference Hsum to "0." Further, the CPU 66 sets the value of the candidate section road type Rt to the road type Rt(3) of the third link (in this case, "1" representing an ordinary road).

Subsequently, the CPU 66 proceeds to step 1035 and adds the length L(i) of the i-th link (the distance between the start point and end point of that link) to the candidate section total distance Dsum. In addition, the CPU 66 adds the height difference ΔH(i) of the i-th link to the candidate section total height difference Hsum. Further, the CPU 66 sets the value of the flat section total distance dsum to "0" and sets the value of the flat section start link Fsta to "0."

Subsequently, the CPU 66 proceeds to step 1040 and judges whether or not the following conditions are satisfied; (1) the candidate section total distance Dsum is greater than the distance threshold Dth, and (2) the candidate section total height difference Hsum is negative and its absolute value is greater than the height difference threshold Th. Since these conditions are not satisfied at the present point in time, the CPU 66 makes a negative judgment (No) in step 1040 and proceeds to step 1045.

When the CPU 66 executes step 1020 for the fourth time (namely, when the value of the variable i is "4"), since link b4 is a downward gradient link, the CPU 66 makes an affirmative judgment (Yes) in step 1020 and proceeds to step 1025. Since the value of the candidate section start link Lsta is "3" at the present, the CPU 66 makes a negative judgment (No) in step 1025 and proceeds to step 1035.

When the CPU 66 executes step 1020 for the sixth time (namely, when the value of the variable i is "6"), since link b6 is a flat link, the CPU 66 makes a negative judgment (No) in step 1020 and proceeds to step 1060. Since the value of the candidate section start link Lsta is "3" at the present, the CPU 66 makes an affirmative judgment (Yes) in step 1060 and proceeds to step 1065 so as to judge whether or not the value of the flat section start link Fsta is "0."

Since the value of the flat section start link Fsta is "0" at the present, the CPU 66 makes an affirmative judgment (Yes) in step 1065 and proceeds to step 1070 so as to set the value of the flat section start link Fsta to the value of the variable i (in this case, "6").

Subsequently, the CPU 66 proceeds to step 1075 and adds the length L(i) of the i-th link to the value of the flat section total distance dsum. As a result, the value of the flat section total distance dsum becomes equal to the distance Db6 of a section corresponding to link b6. In addition, the CPU 66 adds the length L(i) of the i-th link to the candidate section total distance Dsum and adds the height difference ΔH(i) of the i-th link to the candidate section total height difference Hsum.

Subsequently, the CPU 66 proceeds to step 1077 and judges whether or not the flat section total distance dsum is greater than the flat distance threshold Fth. Since the distance Db6 is less than the flat distance threshold Fth, the CPU 66 makes a negative judgment (No) in step 1077 and proceeds to step 1045.

When the CPU 66 executes step 1020 for the seventh time (namely, when the value of the variable i is "7"), since link b7 is a downward gradient link, the CPU 66 makes an affirmative judgment (Yes) in step 1020 and proceeds to step 1005 via step 1025, step 1035, step 1040, step 1045, and step 1047. At that time, the CPU 66 sets the value of the flat section total distance dsum to "0" and sets the value of the flat section start link Fsta to "0" in step 1035.

When the CPU 66 executes step 1020 for the eighth time (namely, when the value of the variable i is "8"), since link b8 is a downward gradient link, the CPU 66 makes an affirmative judgment (Yes) in step 1020 and proceeds to step 1040 via step 1025 and step 1035.

At this point in time, the candidate section total distance Dsum (namely, the distance from point Pb3 to point Pb9) is greater than the distance threshold Dth, and the candidate section total height difference Hsum (the height difference Hb between point Pb3 and point Pb9) is negative and its absolute value is greater than the height difference threshold Th (namely, the height difference threshold Hth1). Accordingly, the CPU 66 makes an affirmative judgment (Yes) in step 1040 and proceeds to step 1042 so as to set the value of the target-downhill-section extraction flag Xslp to "1." Subsequently, the CPU 66 proceeds to step 1045.

After that, when the CPU 66 executes step 1020 for the ninth time (namely, when the value of the variable i is "9"), since link b9 is a flat link, the CPU 66 makes a negative judgment (No) in step 1020 and proceeds to step 1060. Subsequently, the CPU 66 proceeds to step 1077 via step 1060 to step 1075. At this point in time, the value of the flat section start link Fsta has become "9." Since the flat section total distance dsum is equal to the length of the link b9 (the distance Db9) and is less than the flat distance threshold Fth, the CPU 66 makes a negative judgment (No) in step 1077 and proceeds to step 1045.

Further, when the CPU 66 executes step 1020 for the tenth time (namely, when the value of the variable i is "10"), since link b10 is a flat link, the CPU 66 makes a negative judgment (No) in step 1020 and proceeds to step 1060. Subsequently, the CPU 66 proceeds to step 1077 via step 1060, step 1065, and step 1075.

At this point in time, the flat section total distance dsum is equal to the "sum of the length of link b9 (the distance Db9) and the length of link b10 (the distance Db10)" (that is, the distance from point Pb9 to point Pb11). Since the distance from point Pb9 to point Pb11 is greater than the flat distance threshold Fth, the CPU 66 makes an affirmative judgment (Yes) in step 1077 and proceeds to step 1080 so as to judge whether or not the value of the target-downhill-section extraction flag Xslp is "1."

As described above, the value of the target-downhill-section extraction flag Xslp is "1" at this point. Therefore, the CPU 66 makes an affirmative judgment (Yes) in step 1080 and proceeds to step 1085. In step 1085, the CPU 66 sets the value of the candidate section end link Lend to a value which is smaller than the value of the flat section start link Fsta by "1." Specifically, since the value of the flat section start link Fsta is "9" at this point in time (since the start link of the flat section is link b9), the value of the candidate section end link Lend becomes "8." Subsequently, the CPU 66 proceeds to step 1095 and ends the present routine.

Accordingly, in the present example, when the present routine ends, there has been created a state in which the value of the target-downhill-section extraction flag Xslp is "1," the candidate section start link Lsta is "3," and the candidate section end link Lend is "8." In other words, as a result of execution of the present routine, link b3 to link b8 have been extracted as a target-downhill-section.

(Case 2) Case where End Link of Planned Travel Route is the Same as End Link of Target-Downhill-Section Next, this case will be described with reference to an example shown in (A) of FIG. 4. In this case, when the CPU 66 executes step 1020 for the ninth time (namely, when the value of the variable i is "9"), the CPU 66 makes an affirmative judgment (Yes) in step 1020 and proceeds to step 1025 and then to step 1035.

After execution of the processing of step 1035, the candidate section total distance Dsum (namely, the distance from point Pa5 to point Pa10) is greater than the distance threshold Dth. In addition, the candidate section total height difference Hsum (namely, the difference between the height of point Pa5 and the height of point Pa10) is negative and its absolute value is greater than the height difference threshold Th. Accordingly, the CPU 66 makes an affirmative judgment (Yes) in step 1040 and proceeds to step 1042 so as to set the value of the target-downhill-section extraction flag Xslp to "1."

After that, when the CPU 66 executes step 1020 for the tenth time (namely, when the value of the variable i is "10"), the CPU 66 makes an affirmative judgment (Yes) in step 1020, executes the processings of step 1025 and step 1035 to step 1045, and proceeds to step 1047.

At this time, since the value of the variable i is "11," the CPU 66 makes an affirmative judgment (Yes) in step 1047 and proceeds to step 1050 so as to judge whether or not the target-downhill-section extraction flag Xslp is "1" and the value of the candidate section end link Lend is "0."

At this point in time, the target-downhill-section extraction flag Xslp is "1" and the value of the candidate section end link Lend is "0." Therefore, the CPU 66 makes an affirmative judgment (Yes) in step 1050 and proceeds to step 1052. In step 1052, the CPU 66 sets the value of the candidate section end link Lend to a value which is smaller by "1" than the value of the variable i (in this case, Lend=10). Subsequently, the CPU 66 proceeds to step 1095.

Accordingly, in the present example, when the present routine ends, there has been created a state in which the value of the target-downhill-section extraction flag Xslp is "1," the candidate section start link Lsta is "5," and the candidate section end link Lend is "10." In other words, as a result of execution of the present routine, link a5 to link a10 have been extracted as a target-downhill-section.

(Case 3) Case where Downhill Section Contains Long Flat Link

This case will be described with reference to an example shown in (C) of FIG. 4. In this case, link c1 is a downward gradient link. Therefore, when the CPU 66 executes step 1020 for the first time, the CPU 66 makes an affirmative judgment (Yes) in each of step 1020 and step 1025 and proceeds to step 1030 so as to set the value of the candidate section start link Lsta to "1." Further, the CPU 66 sets the value of the candidate section total distance Dsum to "0," sets the value of the candidate section total height difference Hsum to "0," and sets the value of the candidate section road type Rt to the road type Rt(1) (in this case, "1" representing an ordinary road).

After that, when the CPU 66 executes step 1020 for the fourth time (namely, when the value of the variable i is "4"), since link c4 is a flat link, the CPU 66 makes a negative judgment (No) in step 1020 and proceeds to step 1060. The CPU 66 makes an affirmative judgment (Yes) in each of step 1060 and step 1065 and proceeds to step 1070 so as to set the value of the flat section start link Fsta to "4."

Further, when the CPU 66 executes step 1020 for the fifth time (namely, when the value of the variable i is "5"), the CPU 66 makes a negative judgment (No) in step 1020 and proceeds to step 1060. When the CPU 66 makes an affirmative judgment (Yes) in step 1060 and proceeds to step 1065, the value of the flat section start link Fsta is "4." Therefore, the CPU 66 makes a negative judgment (No) in step 1065 and proceeds directly to step 1075.

In step 1075, the flat section total distance dsum becomes equal to the "sum of the length of link c4 (the distance Dc4) and the length of link c5 (the distance Dc5)" and becomes longer than the flat section start link Fsta. Accordingly, the CPU 66 makes an affirmative judgment (Yes) in step 1077 and proceeds to step 1080. The CPU 66 then makes a negative judgment (No) in step 1080 and proceeds to step 1090. In step 1090, the CPU 66 sets the value of the candidate section start link Lsta to "0." Subsequently, the CPU 66 proceeds to step 1045.

Further, when the CPU 66 executes step 1020 for the sixth time (namely, when the value of the variable i is "6"), the CPU 66 makes an affirmative judgment (Yes) in each of step 1020 and step 1025 and proceeds to step 1030 so as to set the value of the candidate section start link Lsta to "6." Further, the CPU 66 sets the value of the candidate section total distance Dsum to "0," sets the value of the candidate section total height difference Hsum to "0," and sets the value of the candidate section road type Rt to the road type Rt(6) (in this case, "1" representing an ordinary road).

After that, when the CPU 66 executes step 1020 for the tenth time (namely, when the value of the variable i is "10"), the CPU 66 makes a negative judgment (No) in each of step 1020 and step 1060 and proceeds to step 1045. Subsequently, the CPU 66 makes an affirmative judgment (Yes) in step 1047 and proceeds to step 1050. At this point in time, the value of the target-downhill-section extraction flag Xslp is "0" and the value of the candidate section end link Lend is "0." Therefore, the CPU 66 makes a negative judgment (No) in step 1050 and proceeds directly to step 1095.

Namely, in this case, when the investigated link is link c5, there is found that the section of link c1 to link c5 is not a target-downhill-section. In addition, when the investigated link is link c6, link c6 is set as the start link of the candidate section. However, when the investigated link becomes link c10; namely, when the candidate section becomes the section of link c6 to link c10, there is found that this candidate section is not a target-downhill-section. In other words, no target-downhill-section is extracted as a result of execution of the present routine.

(Case 4) Case where Planned Travel Route is Expressway Section

This case will be described with reference to (A) of FIG. 5. In this case, when the CPU 66 proceeds to step 1005 after the processing of step 1003, the value of the candidate section start link Lsta is "0." Therefore, the CPU 66 makes an affirmative judgment (Yes) in step 1005 and proceeds to step 1010.

As described above, link d1 is an expressway. Therefore, the CPU 66 makes a negative judgment (No) in step 1010 and proceeds to step 1015. In step 1015, the CPU 66 sets the value of the gradient threshold Tdeg to the gradient threshold degth2 and sets the value of the height difference threshold Th to the height difference threshold Hth2. Subsequently, the CPU 66 proceeds to step 1020.

When the CPU 66 executes step 1020 for the third time (namely, when the value of the variable i is "3"), the CPU 66 makes an affirmative judgment (Yes) in step 1020 and proceeds to step 1025. The CPU 66 then makes an affirmative judgment (Yes) in step 1025 and proceeds to step 1030. In step 1030, the CPU 66 sets the value of the candidate section start link Lsta to "3". Further, the CPU 66 sets the value of the candidate section total distance Dsum to "0," sets the value of the candidate section total height difference Hsum to "0," and sets the value of the candidate section road type Rt to the road type Rt(3) (in this case, "2" representing an expressway).

After that, when the CPU 66 executes step 1020 for the eighth time (namely, when the value of the variable i is "8"), the CPU 66 processed step 1040 via step 1020, step 1025, and step 1035.

At this point in time, the candidate section total distance Dsum (namely, the distance from point Pd3 to point Pd9) is greater than the distance threshold Dth, and the candidate section total height difference Hsum (namely, the height difference Hb between point Pd3 and point Pd9) is negative and its absolute value is greater than the height difference threshold Th (namely, the height difference threshold Hth2). Accordingly, the CPU 66 makes an affirmative judgment (Yes) in step 1040 and proceeds to step 1042.

When the present routine ends after that, there has been created state in which the candidate section start link Lsta is "3" and the candidate section end link Lend is "8." In other words, as a result of execution of the present routine, link d3 to link d8 have been extracted as a target-downhill-section which satisfies all the expressway target downhill conditions.

(Case 5) Case where Road Type Changes Midway in Planned Travel Route (No. 1)

This case will be described with reference to the example shown in (B) of FIG. 5. During execution of the present routine, when the investigated link is link e3, the value of the candidate section start link Lsta is set to "3."

Further, when the investigated link is link e8, the candidate section total distance Dsum (namely, the distance from point Pe3 to point Pe9) is greater than the distance threshold Dth, and the candidate section total height difference Hsum (namely, the height difference He between point Pe3 and point Pe9) is negative and its absolute value is greater than the height difference threshold Th (namely, the height difference threshold Hth2). Accordingly, at this point in time, the value of the target-downhill-section extraction flag Xslp is set to "1."

After that, when the CPU 66 executes step 1005 for the ninth time (namely, when the value of the variable i is "9" and the investigated link is link e9), the candidate section road type Rt is "2" (expressway) and the road type Rt(9) is "1" (ordinary road). Therefore, the CPU 66 makes a negative judgment (No) in step 1005 and proceeds to step 1055 so as to judge whether or not the value of the flat section start link Fsta is "0."

Since the value of the flat section start link Fsta is "0" at the present, the CPU 66 makes an affirmative judgment (Yes) in step 1055 and proceeds to step 1057 so as to set the value of the flat section start link Fsta to the value of the variable i. Next, the CPU 66 proceeds to step 1080.

Since the value of the target-downhill-section extraction flag Xslp "1" at the present, the CPU 66 makes an affirmative judgment (Yes) in step 1080 and proceeds to step 1095 through step 1085. Accordingly, in this case, as a result of execution of the present routine, link e3 to link e8 have been extracted as a target-downhill-section. In other words, a section in which an expressway section (link e3 to link e8) and an ordinary road section (link e9) are mixedly present is not extracted as a target-downhill-section.

(Case 6) Case where Road Type Changes Midway in Planned Travel Route (No. 2)

This case will be described with reference to the example shown in (C) of FIG. 5. During execution of the present routine, when the investigated link is link f3, the value of the candidate section start link Lsta is set to "3." Subsequently, when the investigated link is link f5, the value of the flat section start link Fsta is set to "5."

After that, when the CPU 66 executes step 1005 for the sixth time (namely, when the value of the variable i is "6" and the investigated link is link f6), the candidate section road type Rt is "2" (expressway) and the road type Rt(6) is "1" (ordinary road). Therefore, the CPU 66 makes a negative judgment (No) in step 1005 and proceeds to step 1055.

Since the value of the flat section start link Fsta is "5" at the present, the CPU 66 makes a negative judgment (No) in step 1055 and proceeds to step 1080. Since the value of the target-downhill-section extraction flag Xslp "0" at the present, the CPU 66 makes a negative judgment (No) in step 1080 and proceeds to step 1090. Accordingly, in this case, the CPU 66 performs searching of a candidate section (accordingly, searching of a target-downhill-section) for the section of link f7 to link f10. However, since the section of link f7 to link f10 satisfies neither the ordinary road target downhill conditions nor the expressway target downhill conditions, no target-downhill-section is extracted as a result of execution of the present routine.

(Specific Operation—Execution of Downhill Control by Travel Assisting Apparatus)

Figure 11:
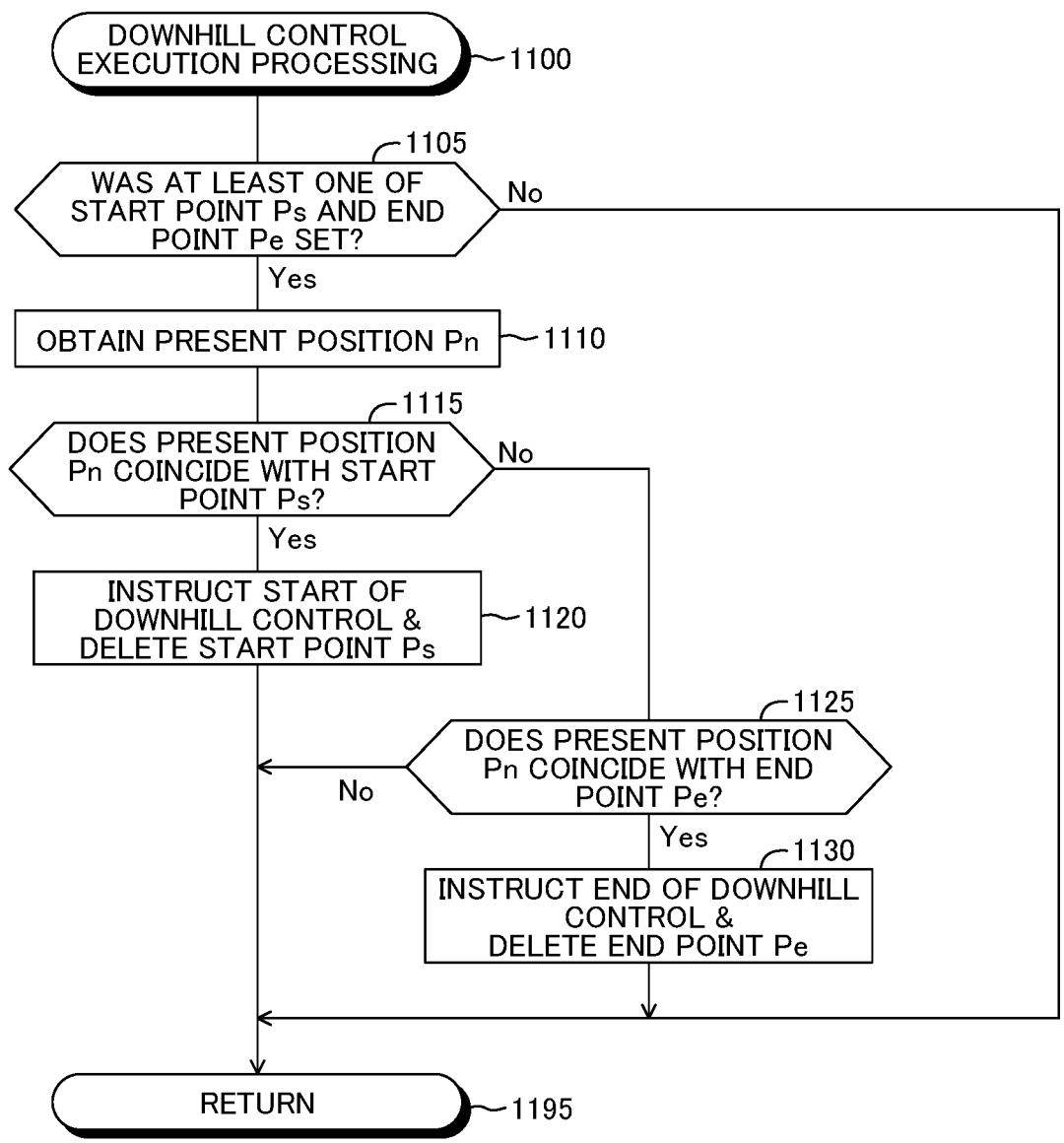
FIG. 11 is a flowchart showing downhill control execution processing executed by the first control apparatus.

In order to execute the downhill control, the CPU 66 executes a "downhill control execution processing routine" represented by the flowchart of FIG. 11 every time a predetermined period of time elapses. Accordingly, when a proper timing comes, the CPU 66 starts the processing from step 1100 of FIG. 11 and proceeds to step 1105 so as to judge whether or not at least one of the start point Ps and end point Pe of the downhill control section has been set.

In the case where at least one of the start point Ps and end point Pe has been set, the CPU 66 makes an affirmative judgment (Yes) in step 1105 and proceeds to step 1110. In step 1110, the CPU 66 obtains the present position Pn which is obtained by the GPS receiving section 62. Subsequently, the CPU 66 proceeds to step 1115 and judges whether or not the present position Pn coincides with the start point Ps.

In the case where the present position Pn coincides with the start point Ps (in actuarially, falls with a range of "the start point Ps–several tens of meters" to "the start point Ps+several tens of meters"), the CPU 66 makes an affirmative judgment (Yes) in step 1115 and proceeds to step 1120 so as to instruct the ECU 40 to start the downhill control. The ECU 40 having received the instruction changes the target remaining capacity SOC* from the standard remaining capacity Sn to the low-side remaining capacity Sd by executing an unillustrated routine. Further, the CPU 66 deletes the data of the start point Ps. Subsequently, the CPU 66 proceeds to step 1195 and ends the present routine temporarily.

Meanwhile, in the case where the present position Pn does not coincide with the start point Ps (including the case where the start point Ps has been deleted), the CPU 66 makes a negative judgment (No) in step 1115 and proceeds to step 1125 so as to judge whether or not the present position Pn coincides with the end point Pe.

In the case where the present position Pn coincides with the end point Pe, the CPU 66 makes an affirmative judgment (Yes) in step 1125 and proceeds to step 1130 so as to instruct the ECU 40 to end the downhill control. The ECU 40 having received the instruction changes the target remaining capacity SOC* from the low-side remaining capacity Sd to the standard remaining capacity Sn by executing an unillustrated routine. Further, the CPU 66 deletes the data of the end point Pe. Subsequently, the CPU 66 proceeds to step 1195.

In the case where none of the start point Ps and the end point Pe has been set, the CPU 66 makes a negative judgment (No) in step 1105 and proceeds directly to step 1195. In addition, in the case where the present position Pn does not coincide with the end point Pe, the CPU 66 makes a negative judgment (No) in step 1125 and proceeds directly to step 1195.

As described above, the first control apparatus (the ECU 40 and the travel assisting apparatus 60) is a hybrid vehicle control apparatus applied to a hybrid vehicle (10) which includes an internal combustion engine (23) and a motor (the first motor 21 and the second motor 22) as drive sources of the vehicle, includes a storage battery (31) for supplying electric power to the motor, and is configured to perform regenerative braking by using the motor and charge the storage battery with electric power generated as a result of the regenerative braking and electric power generated by using output of the internal combustion engine, the hybrid vehicle control apparatus comprising a controller which controls the internal combustion engine and the motor in such a manner that the vehicle produces a demanded drive force (the demanded ring gear torque Tr*) and the remaining capacity (SOC) of the storage battery approaches a predetermined target remaining capacity (SOC*).

The controller comprises:

a target-downhill-section extraction portion (step 915 of FIG. 9 and FIG. 10) which obtains a planned travel route of the vehicle and extracts, as a target-downhill-section, a downhill section which is contained in the planned travel route and which has a height difference between a start point and an end point of the downhill section greater in absolute value than a predetermined height difference threshold (the height difference threshold Hth1 and the height difference threshold Hth2); and a downhill control portion (FIG. 11) which is operable, when the target-downhill-section is extracted, so as to execute downhill control when the vehicle travels in a particular section of a section which extends to the end point of the target-downhill-section from a downhill control start point which is shifted back from the start point of the target-downhill-section by a predetermined distance, the particular section containing at least a section extending from the downhill control start point to the start point of the target-downhill-section, and the downhill control being adapted to change the target remaining capacity to a remaining capacity (the low-side remaining capacity Sd) smaller as compared with the case where the vehicle travels in sections other than the particular section, wherein the target-downhill-section extraction portion includes a height difference threshold setting portion (step 1010 to step 1015 of FIG. 10) which is operable, when an estimated average speed of the vehicle during travel in the downhill section is estimated to be a first speed, so as to set the height difference threshold to a larger value (the height difference threshold Hth2) as compared with the case where the estimated average speed of the vehicle is estimated to be a second speed lower than the first speed.

In addition, the first control apparatus is configured to extract the target-downhill-section from downhill sections each composed of continuous road sections whose road types are only expressways or only roads other than expressways (the above-described conditions (a1) and (a2)) and is configured to estimate that the estimated average speed is the first speed when the road type of a downhill section is the expressway and to estimate that the estimated average speed is the second speed when the road type of the downhill section is the road other than the expressway (step 1010 to step 1015 of FIG. 10).

According to the first control apparatus, it is possible to properly extract a target-downhill-section in consideration of the vehicle speed Vs during travel in each downhill section. As a result, the effect of improving fuel efficiency through execution of the downhill control can be obtained without fail. In addition, according to the first control apparatus, it is possible to restrain occurrence of a phenomenon that since the remaining capacity SOC does not increase sufficiently during the travel in the target-downhillsection, charging and discharging are repeated in a state in which the remaining capacity SOC is low, whereby deterioration of the storage battery accelerates.

Second Embodiment

Next, a hybrid vehicle control apparatus according to a second embodiment (hereinafter also referred to as the "second control apparatus") will be described. The first control apparatus extracts a target-downhill-section on the basis of the road type (either of an ordinary road and an expressway) of each of links which constitute the planned travel route. The second control apparatus differs from the first control apparatus only in the point that the second control apparatus extracts a target-downhill-section on the basis of the estimated vehicle speed Ve at the time when the vehicle 10 travels through each of links which constitute a section to be judged. Accordingly, this difference will be mainly described below.

The map database stored in the database 63 of a travel assisting apparatus 71 according to the second control apparatus contains estimated vehicle speed Ve which is the estimated average of the vehicle speed Vs at the time when the vehicle 10 travels through each link. Notably, the estimated vehicle speed Ve is learned as will be described later. The computation section 61 uses different target downhill conditions depending on the result of judgment as to whether the estimated vehicle speed Ve of each of the links which constitute the section to be judged is less than a speed threshold Vth.

A set of links having estimated vehicle speeds Ve less than the speed threshold Vth will also be referred to as a "low speed section," and a set of links having estimated vehicle speeds Ve equal to or greater than the speed threshold Vth will also be referred to as a "high speed section." In the present embodiment, the speed threshold Vth is 60 km/h.

When the computation section 61 searches a target-downhill-section contained in the planned travel route of the vehicle 10, the computation section 61 uses different target downhill conditions depending on the result of judgment as to whether the section to be judged is a low speed section or a high speed section. The target-downhill-section contains a low speed section only or a high speed section only. Namely, the computation section 61 does not extract, as a single target-downhill-section, a section in which a low speed section and a high speed section are mixedly present.

A downward gradient link in a low speed section is a downhill section in which the average gradient of the link is greater than a gradient represented by the gradient threshold degth1 (degth1<0) (namely, a downhill section whose gradient is greater than the gradient threshold degth1). Meanwhile, a downward gradient link in a high speed section is a downhill section in which the average gradient of the link is greater than a gradient represented by the gradient threshold degth2 (degth2<degth1) (namely, a downhill section whose gradient is greater than the gradient threshold degth2).

The target downhill conditions (low speed section target downhill conditions) used when the section to be judged is a low speed section are as follows.
(a3) The section to be judged is a section constituted by a low speed section only.
(b1) Its start link and end link are downward gradient links (namely, downhill sections whose gradients are greater than the gradient threshold degth1).
(c) The distance between the start point and the end point is greater than the distance threshold Dth.

(d1) The height of the end point is lower than the height of the start point, and the height difference is greater than the height difference threshold Hth1.
(e) The distance of continuous flat link sections contained in the section to be judged is less than the flat distance threshold Fth.

Meanwhile, the target downhill conditions (high speed section downhill conditions) used when the section to be judged is a high speed section are as follows.
(a4) The section to be judged is a section constituted by a high speed section only.
(b2) Its start link and end link are downward gradient links (namely, downhill sections whose gradients are greater than the gradient threshold degth2).
(c) The distance between the start point and the end point is greater than the distance threshold Dth.
(d2) The height of the end point is lower than the height of the start point, and the height difference is greater than the height difference threshold Hth2 (Hth2>Hth1).
(e) The distance of continuous flat link sections contained in the section to be judged is less than the flat distance threshold Fth.

(Learning of Estimated Vehicle Speed Ve by Travel Assisting Apparatus)

The computation section 61 increases the accuracy of the estimated vehicle speed Ve by performing learning of the estimated vehicle speed Ve. Namely, while the vehicle 10 is travelling, the computation section 61 specifies a link through which the vehicle 10 is travelling by applying the present position Pn to the map database. When the vehicle 10 has traveled through a certain link, the computation section 61 calculates an average vehicle speed Va on the basis of the distance from the start point of that link to the end point thereof and the time which the vehicle 10 actually used to travel from the start point to the end point.

When the vehicle 10 has travelled through that link for the first time, the computation section 61 adds the average vehicle speed Va to the map database as the estimated vehicle speed Ve. Alternatively, in the case where the vehicle 10 travelled through that link a plurality of times, the computation section 61 calculates, as the estimated vehicle speed Ve, the average of the average vehicle speeds Va of latest 20 travels, and adds that estimated vehicle speed Ve to the map database. In the map database, the estimated vehicle speed Ve of each of links through which the vehicle 10 has never travelled is set to the highest speed (legal highest speed or speed limit) of the section (road) provided for each link.

(Example of Target-Downhill-Section)

Figure 12:
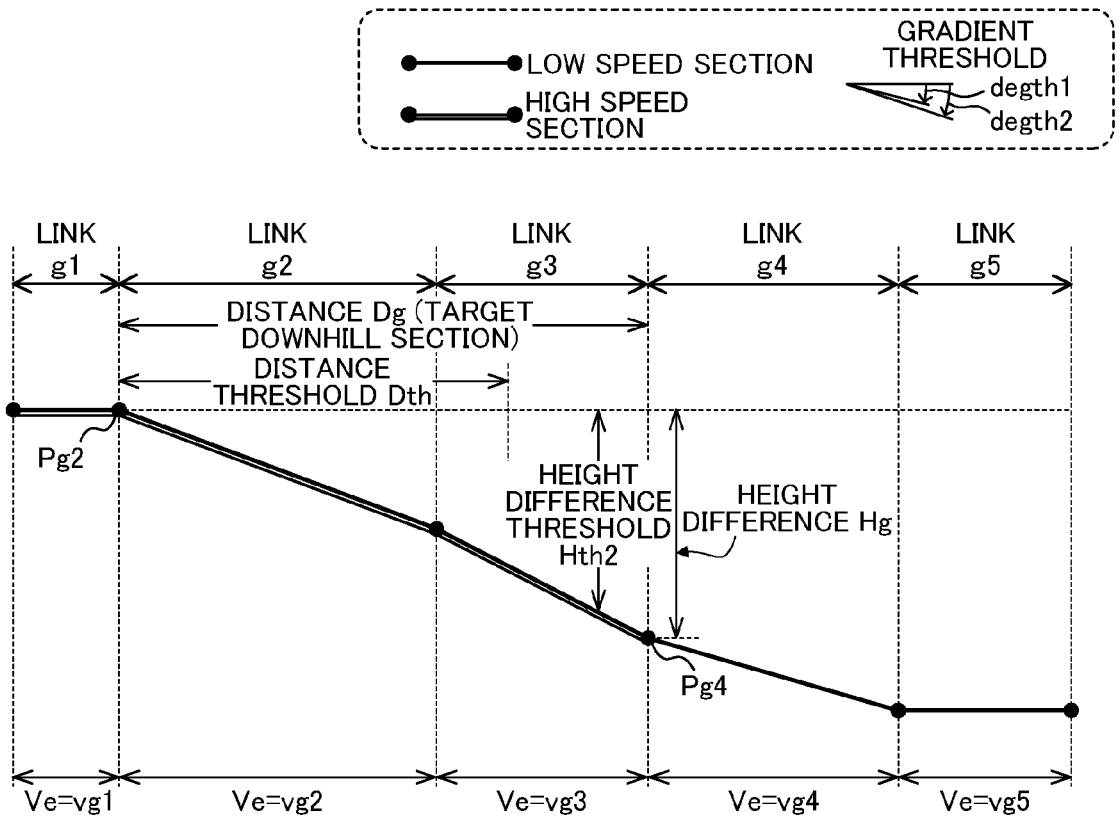
FIG. 12 shows an example of a target-downhill-section extracted by a hybrid vehicle control apparatus (second control apparatus) according to a second embodiment.

FIG. 12 shows an example of a target-downhill-section in the present embodiment. FIG. 12 shows a planned travel route of the vehicle 10 which is constituted by five links (link g1 to link g5). The estimated vehicle speeds Ve of link g1 to link g5 are vehicle speed vg1 to vehicle speed vg5, respectively.

Link g1 to link g3 are high speed sections (namely, vg1≥Vth, vg2≥Vth, and vg3≥Vth). Meanwhile, link g4 to link g5 are low speed sections (namely, vg4<Vth and vg5<Vth). Link g2 to link g4 are downward gradient links, and link g1 and link g5 are flat links.

When link g2 to link g3 are considered to be a section to be judged, the distance Dg from the start point Pg2 of link g2 to the end point Pg4 of link g3 is greater than the distance threshold Dth. The height of the end point Pg4 of link g3 is lower than the height of the start point Pg2 of link g2, and its height difference (absolute value) Hg is greater than the height difference threshold Hth2. Since each of link g2 to link g3 is a downward gradient link and is not a flat link, the flat link distance is "0" and is less than the flat distance threshold Fth. Accordingly, the section of link g2 to link g3 satisfies all the above-described conditions (a4), (b2), (c), (d2), and (e). Therefore, these links constitute a target-downhill-section.

For example, when link g2 to link g4 are considered to be a section to be judged, since a low speed section and a high speed section are mixedly present in the section to be judged, none of the above-described conditions (a3) and (a4) is satisfied. Accordingly, neither the low speed section target downhill conditions nor the high speed section target downhill conditions are satisfied. Therefore, link g2 to link g4 do not constitute a target-downhill-section.

(Specific Operation—Search of Target-Downhill-Section by Travel Assisting Apparatus)

The CPU 66 of the computation section 61 executes the "control section setting processing routine" represented by the flowchart of FIG. 9. When the computation section 61 proceeds to step 910, it executes a "target downhill search processing routine" represented by the flowchart of FIG. 13. The steps shown in the flowchart of FIG. 13 which are identical in processing to the steps shown in the flowchart of FIG. 10 are denoted by the same reference numerals as those used in FIG. 10.

During execution of the present routine (the target downhill search processing routine of FIG. 13), the CPU 66 sets the value of a candidate section road type Ru to "1" when the candidate section is constituted by a low speed section and sets the value of a candidate section road type Ru to "2" when the candidate section is constituted by a high speed section.

Figure 13:
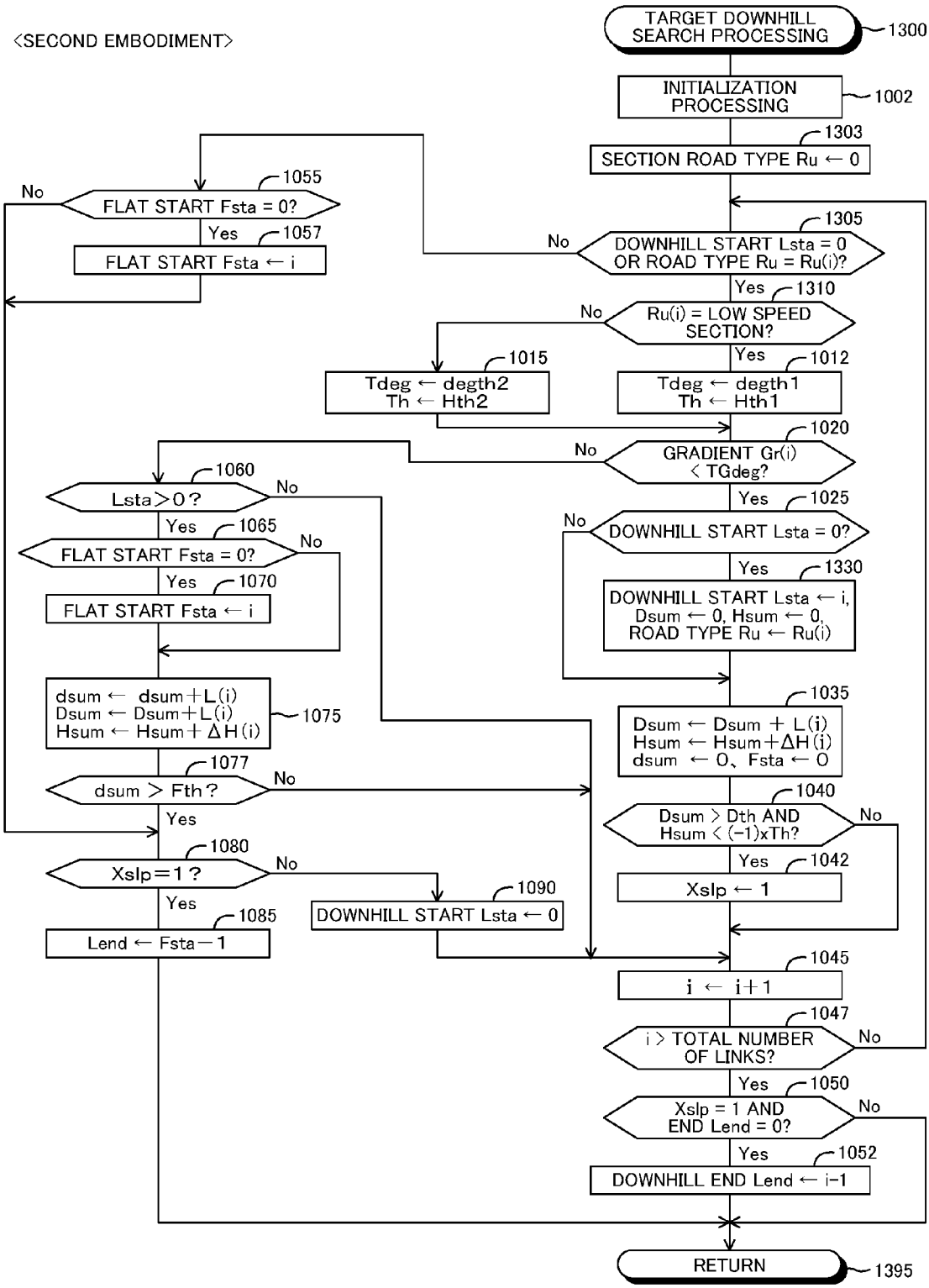
FIG. 13 is a flowchart showing target downhill search processing executed by the second control apparatus.

When a proper timing comes, the CPU 66 starts the processing from step 1300 of FIG. 13 and proceeds to step 1002. Subsequently, the CPU 66 proceeds to step 1303 and sets the value of the candidate section road type Ru to "0" which is an initial value.

Subsequently, the CPU 66 proceeds to step 1305 and judges whether or not the value of the candidate section start link Lsta is "0" or the candidate section road type Ru is the same as the road type Ru(i) of the i-th link. When the CPU 66 makes an affirmative judgment (Yes) in step 1305, it proceeds to step 1310 so as to judge whether or not the road type Ru(i) is a low speed section.

When the CPU 66 makes an affirmative judgment (Yes) in step 1310, it proceeds to step 1012. Meanwhile, when the CPU 66 makes a negative judgment (No) in step 1310, it proceeds to step 1015. Notably, when the CPU 66 makes a negative judgment (No) in step 1315, it proceeds to step 1055.

When the CPU 66 makes an affirmative judgment (Yes) in step 1025, it proceeds to step 1330 and sets the value of the candidate section start link Lsta to the value of the variable i. In addition, the CPU 66 sets the value of the candidate section total distance Dsum to "0" and sets the value of the candidate section total height difference Hsum to "0." Further, the CPU 66 sets the value of the candidate section road type Ru to the road type Ru(i) of the i-th link. Subsequently, the CPU 66 proceeds to step 1035.

After having executed the processing of step 1052 and after having executed the processing of step 1085, the CPU 66 proceeds to step 1395 and ends the present routine.

As described above, the second control apparatus (the ECU 40 and the travel assisting apparatus 60) is configured to estimate the estimated average speed (estimated vehicle speed Ve) on the basis of a value corresponding to an average speed (Va) at which the vehicle (10) or vehicles other than the vehicle traveled through the downhill section in the past.

According to the second control apparatus, it is possible to properly extract a target-downhill-section to thereby obtain, without fail, the effect of improving fuel efficiency through execution of the downhill control. In addition, according to the second control apparatus, it is possible to restrain occurrence of a phenomenon that since the remaining capacity SOC does not increase sufficiently during the travel in the target-downhill-section, charging and discharging are repeated in a state in which the remaining capacity SOC is low, whereby deterioration of the storage battery accelerates.

Third Embodiment

Next, a hybrid vehicle control apparatus according to a third embodiment (hereinafter also referred to as the "third control apparatus") will be described. The second control apparatus selectively uses different height difference thresholds (the height difference threshold Hth1 and the height difference threshold Hth2) depending on the result of the judgment as to whether or not the estimated vehicle speed Ve of each of the links constituting the section to be judged is less than the speed threshold Vth (namely, whether each link is a low speed section or a high speed section). The third control apparatus differs from the second control apparatus only in the point that the third control apparatus estimates the section average speed Vd of the section to be judged on the basis of the estimated vehicle speed Ve of each of the links constituting the section to be judged and determines the height difference threshold Hthv in accordance with the section average speed Vd. Accordingly, this difference will be mainly described below.

The computation section 61 of a travel assisting apparatus 72 according to the third control apparatus calculates the section average speed Vd, at which the vehicle 10 travels through the section to be judged, on the basis of the estimated vehicle speed Ve of each of the links constituting the section to be judged. The computation section 61 determines the height difference threshold Hthv by applying the section average speed Vd to the "relation between the section average speed Vd and the height difference threshold Hthv" shown in FIG. 14.

Figure 14:
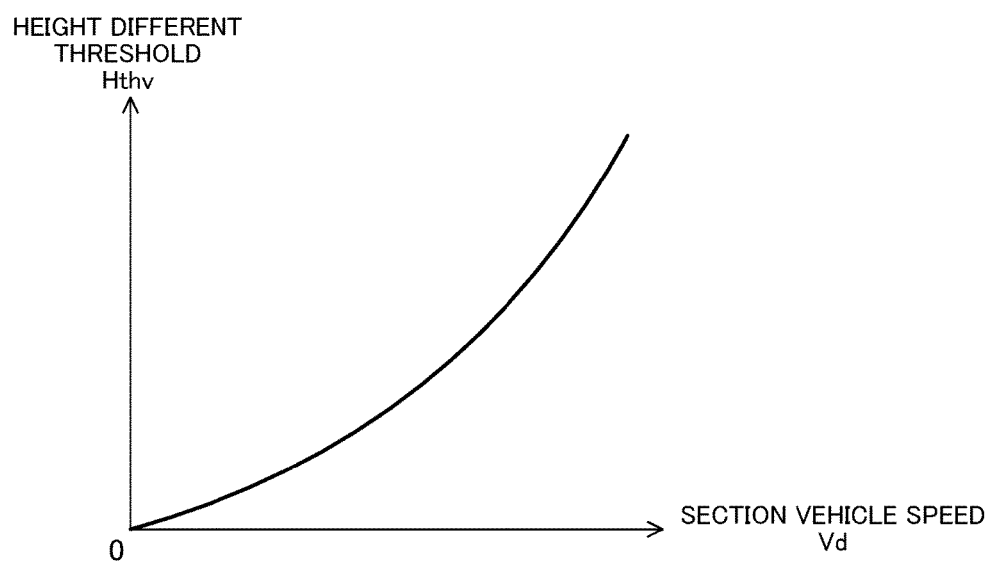
FIG. 14 is a graph showing the relation between section vehicle speed and height difference threshold.

The relation shown in FIG. 14 is stored in the ROM 42 in the form of a lookup table (map). As can be understood from FIG. 14, the greater the section average speed Vd, the greater the height difference threshold Hthv. The height difference threshold Hthv is determined such that as a result of the above-described conversion of the potential energy of the vehicle 10 to electrical energy, the amount of electrical energy corresponding to the electric power amount S10 is obtained (is charged into the storage battery 31) even when the "energy loss due to the air resistance acting on the vehicle 10 when the vehicle speed Vs is the section average speed Vd" is subtracted.

A downward gradient link in the present embodiment is a downhill section in which the average gradient of the link is greater than a gradient represented by the gradient threshold degth3 (degth3<0) (namely, a downhill section whose gradient is greater than the gradient threshold degth3).

The target downhill conditions in the present embodiment are as follows.

(b3) The start link and end link are downward gradient links (namely, downhill sections whose gradients are greater than the gradient threshold degth3).

(c) The distance between the start point and the end point is greater than the distance threshold Dth.
(d3) The height of the end point is lower than the height of the start point, and the height difference is greater than the height difference threshold Hthv.
(e) The distance of continuous flat link sections contained in the section to be judged is less than the flat distance threshold Fth.

(Example of Target-Downhill-Section)

Figure 15:
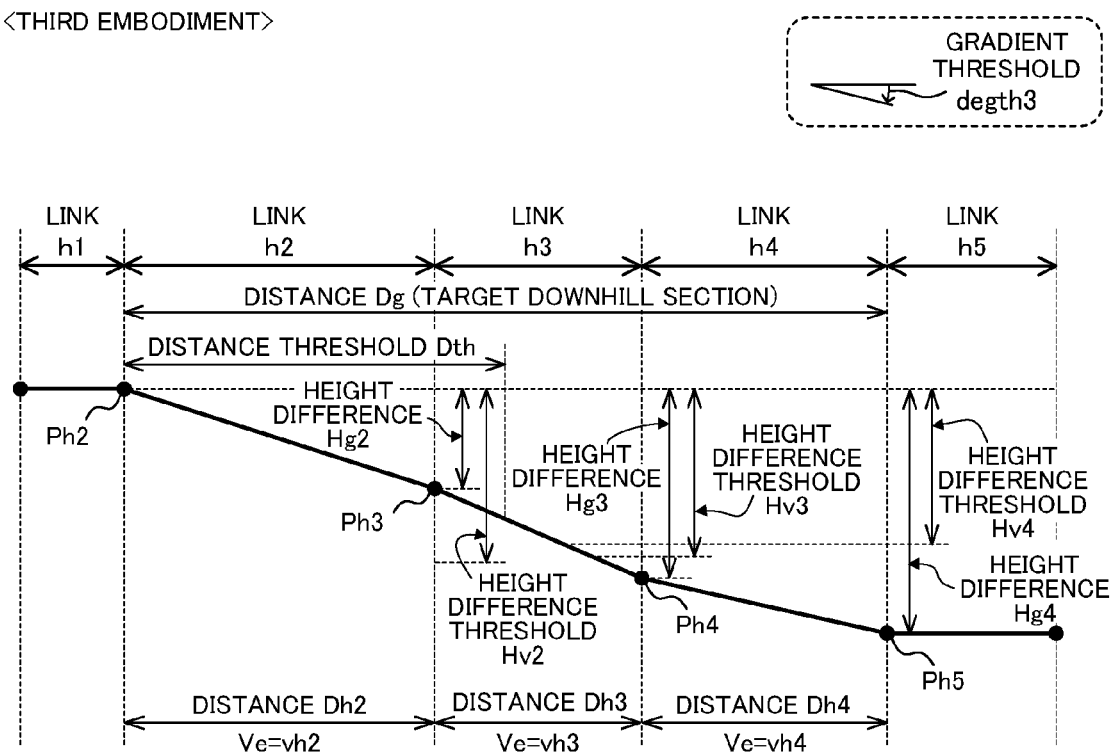
FIG. 15 shows an example of a target-downhill-section extracted by a hybrid vehicle control apparatus (third control apparatus) according to a third embodiment.

FIG. 15 shows an example of a target-downhill-section in the present embodiment. FIG. 15 shows a planned travel route of the vehicle 10 which is constituted by five links (link h1 to link h5). The estimated vehicle speeds Ve of link h2 to link h4 are vehicle speed vh2 to vehicle speed vh4, respectively. Link h2 to link h4 are downward gradient links, and link h1 and link h5 are flat links.

When link h2 is considered to be a section to be judged, the "section average speed Vd at the time when the vehicle 10 travels from the start point Ph2 of link h2 to the end point Ph3 of link h2" is equal to the vehicle speed vh2. In this case, the computation section 61 obtains the height difference threshold Hv2 by applying the section average speed vd2 to the map shown in FIG. 14.

Although the height of the end point Ph3 of link h2 is lower than the height of the start point Ph2 of link h2, its height difference (absolute value) is less than the height difference threshold Hv2. In addition, the distance Dh2 from the start point Ph2 of link h2 to the end point Ph3 of link h2 is less than the distance threshold Dth. Accordingly, the section to be judged (link h2) satisfies none of the above-described conditions (c) and (d3). Therefore, the section to be judged is not a target-downhill-section.

Subsequently, the computation section 61 considers link h2 to link h3 as a section to be judged. In this case, the computation section 61 calculates a section average speed vd3 which is the section average speed Vd at the time when the vehicle 10 travels from the start point Ph2 of link h2 to the end point Ph4 of link h3. More specifically, the section average speed vd3 is calculated by dividing the distance (distance Dh2+distance Dh3) of the section to be judged (link h2 to link h3) by a time Ts3 which the vehicle 10 needs to travel through the section.

A time Sh2 which the vehicle 10 needs to travel through link h2 is calculated by diving the distance Dh2 by the vehicle speed vh2 (namely, Sh2=Dh2/vh2). Similarly, a time Sh3 which the vehicle 10 needs to travel through link h3 is calculated by diving the distance Dh3 by the vehicle speed vh3 (namely, Sh3=Dh3/vh3). Accordingly, the section average speed vd3 can be represented by the following expression (3).

$$vd3 = (Dh2 + Dh3)/(Sh2 + Sh3) \quad (3)$$
$$= (Dh2 + Dh3)/(Dh2/vh2 + Dh3/vh3)$$

The computation section 61 obtains the height difference threshold Hv3 by applying the section average speed vd3 to the map shown in FIG. 14. The height of the end point Ph4 of link h3 is lower than the height of the start point Ph2 of link h2 and its height difference (absolute value) Hg3 is greater than the height difference threshold Hv3. In addition, the distance (Dh2+Dh3) from the start point Ph2 of link h2 to the end point Ph4 of link h3 is greater than the distance threshold Dth. Accordingly, all the above-described conditions (b3), (c), (d3), and (e) are satisfied.

Further, the computation section 61 considers link h2 to link h4 as a section to be judged. In this case, the computation section 61 obtains a height difference threshold Hv4 on the basis of a section average speed vd4 which is the section average speed Vd at the time when the vehicle 10 travels from the start point Ph2 of link h2 to the end point Ph5 of link h4.

In this case, the height of the end point Ph5 of link h4 is lower than the height of the start point Ph2 of link h2 and its height difference (absolute value) Hg4 is greater than the height difference threshold Hv4. In addition, the distance (Dh2+Dh3+Dh4) from the start point Ph2 of link h2 to the end point Ph5 of link h4 is greater than the distance threshold Dth. Accordingly, all the above-described conditions (b3), (c), (d3), and (e) are satisfied. The computation section 61 extracts the section of link h2 to link h4, which includes a larger number of downward gradient links, as a target-downhill-section, and executes the downhill control for the section of link h2 to link h4 (not for the section of link h2 to link h3).

(Specific Operation—Search of Target-Downhill-Section by Travel Assisting Apparatus)

The CPU 66 of the computation section 61 executes the "control section setting processing routine" represented by the flowchart of FIG. 9. When the computation section 61 proceeds to step 910, it executes a "target downhill search processing routine" represented by the flowchart of FIG. 16. The steps shown in the flowchart of FIG. 16 which are identical in processing to the steps shown in the flowchart of FIG. 10 are denoted by the same reference numerals as those used in FIG. 10.

During execution of the present routine (the target downhill search processing routine of FIG. 16), the CPU 66 sets the "time which the vehicle 10 needs to travel from the start point to the end point of the candidate section" as the value of a candidate section travel time Tsum. Further, the CPU 66 calculates the section average speed Vd by dividing the candidate section travel time Tsum by the candidate section total distance Dsum.

Figure 16:
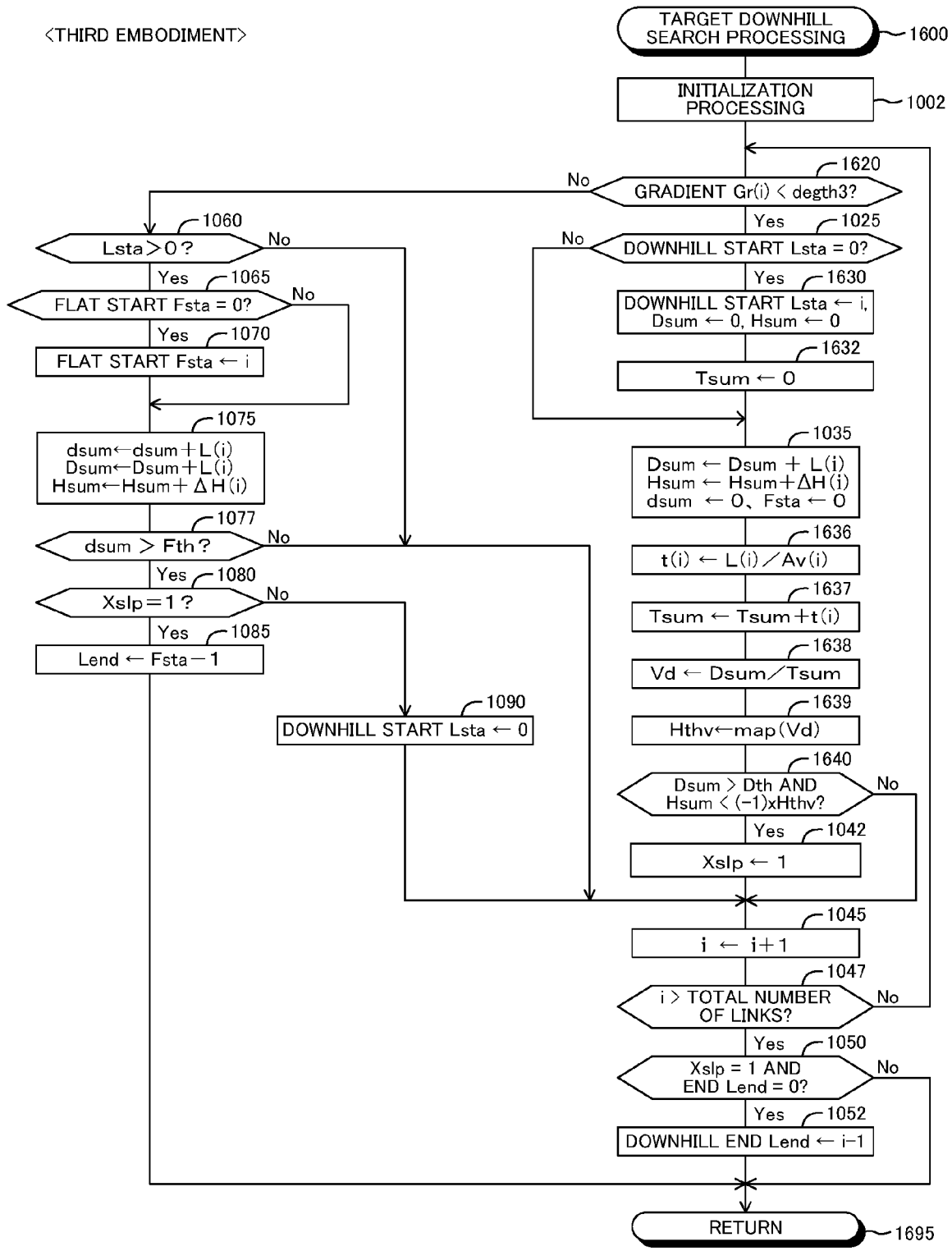
FIG. 16 is a flowchart showing target downhill search processing executed by the third control apparatus.

When a proper timing comes, the CPU 66 starts the processing from step 1600 of FIG. 16 and proceeds to step 1002. Subsequently, the CPU 66 proceeds to step 1620 and judges whether or not the average gradient Gr(i) of the i-th link is less than the gradient threshold degth3 (namely, this link is a downward gradient link).

When the CPU 66 makes an affirmative judgment (Yes) in step 1620, it proceeds to step 1025. Meanwhile, when the CPU 66 makes a negative judgment (No) in step 1620, it proceeds to step 1060.

When the CPU 66 makes an affirmative judgment (Yes) in step 1025, it proceeds to step 1630 and sets the value of the candidate section start link Lsta to the value of the variable i. In addition, the CPU 66 sets the value of the candidate section total distance Dsum to "0" and sets the value of the candidate section total height difference Hsum to "0." Subsequently, the CPU 66 proceeds to step 1632 and sets the value of the candidate section travel time Tsum to "0." After that, the CPU 66 proceeds to step 1035. After the processing of step 1035, the CPU 66 successively performs the processings of steps 1636 to step 1639 and proceeds to step 1640.

Step 1636: The CPU 66 sets, as the value of an investigated link travel time t(i), the "time which the vehicle 10 needs to travel from the start point to the end point of the i-th link." Specifically, the CPU 66 calculates the investigated link travel time t(i) by dividing the length L(i) of the i-th link by the estimated vehicle speed Ve of that link. Notably, as in the case of the second control apparatus, the estimated vehicle speed Ve is learned and updated on the basis of the average vehicle speed Va obtained when the vehicle 10 traveled actually.

Step 1637: The CPU 66 adds the investigated link travel time t(i) to the value of the candidate section travel time Tsum.

Step 1638: The CPU 66 calculates the section average speed Vd by dividing the candidate section total distance Dsum by the candidate section travel time Tsum.

Step 1639: The CPU 66 obtains the height difference threshold Hthv by applying the section average speed Vd to the map shown in FIG. 14.

In step 1640, the CPU 66 judges whether or not the following conditions are satisfied: (1) the candidate section total distance Dsum is greater than the distance threshold Dth; and (2) the candidate section total height difference Hsum is negative and its absolute value is greater than the height difference threshold Hthv. When the CPU 66 makes an affirmative judgment (Yes) in step 1640, it proceeds to step 1042. Meanwhile, when the CPU 66 makes a negative judgment (No) in step 1640, it proceeds to step 1045.

According to the third control apparatus, it becomes possible to properly extract a target-downhill-section even when the planned travel route includes different road types (e.g., an ordinary road and an expressway). In addition, according to the third control apparatus, it is possible to restrain occurrence of a phenomenon that since the remaining capacity SOC does not increase sufficiently during the travel in the target-downhill-section, charging and discharging are repeated in a state in which the remaining capacity SOC is low, whereby deterioration of the storage battery accelerates.

Although embodiments of the hybrid vehicle control apparatus have been described, the present disclosure is not limited to the above-described embodiments and may be changed in various ways. For example, the travel assisting apparatus in each embodiment receives signals from GPS satellites. However, the travel assisting apparatus may receive other satellite positioning signals in place of or in addition to the GPS signals. For example, the other satellite positioning signals may be GLONASS (Global Navigation Satellite System) and QZSS (Quasi-Zenith Satellite System).

In the case where the downhill control is executed in each embodiment, the target remaining capacity SOC* is changed from the low-side remaining capacity Sd to the standard remaining capacity Sn when the vehicle 10 reaches the end point of each target-downhill-section. However, in the case where the downhill control is executed, the target remaining capacity SOC* may be changed from the low-side remaining capacity Sd to the standard remaining capacity Sn when the vehicle 10 reaches the start point of each target-downhill-section. Alternatively, in the case where the downhill control is executed, the target remaining capacity SOC* may be changed from the low-side remaining capacity Sd to the standard remaining capacity Sn when the vehicle 10 is located midway in each target-downhill-section.

In each embodiment, when the travel assisting apparatus extracts a target-downhill-section, the travel assisting apparatus performs the extracting operation for a route extending to the destination from a point on the planned travel route which is separated from the present position Pn by the pre-use distance Dp. However, the travel assisting apparatus may perform the extracting operation for a route extending from the present position Pn on the planned travel route to the destination.

Alternatively, the travel assisting apparatus of each embodiment may perform the extraction operation as follows. When the travel assisting apparatus extracts a target-downhill-section, the travel assisting apparatus performs the extracting operation for a route extending from the "present position Pn" to a "position which is locate at a predetermined distance (e.g., 5 km) from the present position Pn on the planned travel route." In this case, irrespective of whether the downhill control is executed, the travel assisting apparatus may execute the target-downhill-section extraction processing periodically (e.g., at intervals of 5 minutes) or every time the vehicle 10 travels over a predetermined distance.

In each embodiment, when the vehicle 10 has reached the start point Ps of a downhill control section or the end point Pe thereof, the travel assisting apparatus notifies the ECU 40 of the fact that the vehicle 10 has reached the start point Ps or the end point Pe. However, when the travel assisting apparatus decides to execute the downhill control, the travel assisting apparatus may notify the ECU 40 of the distance from the present position Pn to the start point Ps and the distance from the present position Pn to the end point Pe. In this case, the ECU 40 may obtain the distances from the present position Pn at that point in time to the start point Ps and the end point Pe on the basis of the travel distance of the vehicle 10 obtained by integrating the vehicle speed Vs with respect to time, and change the value of the target remaining capacity SOC* when the vehicle 10 reaches the start point Ps or the end point Pe.

The map database in each embodiment contains the length and gradient of each link. However, the map database may contain the heights of opposite ends of each link instead of the gradient of each link.

In each embodiment, the travel assisting apparatus judges that a downhill section satisfying any one of the above-described target downhill condition sets is a target-downhill-section. However, the conditions (b1), (b2), and (b3) in the above-described target downhill condition sets may be omitted. In this case, even when either one or both of the start link and the end link of a section to be judged are not a downward gradient link, the section to be judged is judged to be a target-downhill-section if the remaining conditions are satisfied.

Alternatively, the condition (c) in the above-described target downhill condition sets may be omitted. In this case, even when the distance between the start point and the end point of a downhill section is short, that section to be judged is judged to be a target-downhill-section if the height difference between the start point and the end point is greater than the height difference threshold.

In the first embodiment and the second embodiment, the absolute value of the gradient threshold degth2 is larger than the absolute value of the gradient threshold degth1 (namely, degth2<degth1<0). However, the gradient threshold degth2 and the gradient threshold degth1 may be equal to each other.

In the first embodiment and the second embodiment, the height difference threshold Th is set to either one of two values; i.e., the height difference threshold Hth1 and the height difference threshold Hth2. However, the height difference threshold Th may be set to any one of three or more values. In this case, the height difference threshold Th is set such that the absolute value of the height difference threshold Th increases with the average (estimated value) of the vehicle speed Vs at which the vehicle 10 travels through the candidate section.

In the second embodiment, the estimated vehicle speed Ve of each of links through which the vehicle 10 has never travelled is set to the highest speed (legal highest speed or speed limit) of the section (road) provided for each link. However, the second control apparatus may handle each link through which the vehicle 10 has never travelled as a low speed section if that link is an ordinary road and handle each link through which the vehicle 10 has never travelled as a high speed section if that link is an expressway.

Alternatively, the driver of the vehicle 10 may register the estimated vehicle speed Ve for each link. Further, the driver may register the estimated vehicle speed Ve for each of attributes of links (for example, interstate highways, freeways, expressways, thruways, turnpikes, etc.).

Alternatively, the travel assisting apparatus may include an onboard communication section and obtain the estimated vehicle speed Ve of each of the links constituting a planned travel route by wireless data communications with a predetermined communication center through the onboard communication section. In this case, the estimated vehicle speed Ve may be obtained on the basis of the average vehicle speed Va at the time when a vehicle(s) other than the vehicle 10 actually traveled through each link.

The travel assisting apparatus according to each embodiment executes the target downhill search processing in such a manner that even after a section satisfying the target downhill conditions has been extracted from a planned travel route, the travel assisting apparatus further judges whether or not a "section obtained by adding a "link following that downhill section" to that downhill section" satisfies the target downhill conditions. However, the travel assisting apparatus may end the target downhill search processing when a section satisfying the target downhill condition is extracted.

The map database in the preset embodiment is constituted by a hard disk drive. However, the map database may be constituted by a solid state drive (SSD) using a recording medium such as flash memory or the like.

What is claimed is:

1. A hybrid vehicle control apparatus for controlling a hybrid vehicle which includes an internal combustion engine and a motor as drive sources of the vehicle, and a storage battery that supplies electric power to the motor, the vehicle being configured to perform regenerative braking by using the motor as a generator, and charge the storage battery with electric power generated as a result of the regenerative braking and electric power generated by using an output of the internal combustion engine, the hybrid vehicle control apparatus comprising:
   a controller configured to control the internal combustion engine and the motor so that the vehicle produces a demanded drive force and a remaining capacity of the storage battery remains above a predetermined minimum target remaining capacity, the controller being further configured to:
   obtain a planned travel route of the vehicle and extract a downhill section from the planned travel route as a target-downhill-section, the downhill section having a height difference between a start point and an end point of the downhill section, the height difference being greater in absolute value than a predetermined height difference threshold; and
   when the target-downhill-section is extracted, execute a downhill control operation while the vehicle travels in a particular section, the particular section extending to the end point of the target-downhill-section from a downhill control start point which is located upstream of the start point of the target-downhill-section by a predetermined distance, the downhill control operation decreasing the predetermined minimum target remaining capacity at least in a portion of the particular section between the downhill control start point and the start point of the target-downhill-section compared with when the vehicle travels in sections other than the particular section,
   wherein the controller sets the predetermined height difference threshold based on an estimated average speed of the vehicle during travel in the downhill section, so that when the estimated average speed is a first speed, the predetermined height difference threshold is set to a relatively larger value as compared to when the estimated average speed is a second speed lower than the first speed.

2. The hybrid vehicle control apparatus according to claim 1, wherein
   the controller extracts the target-downhill-section from downhill sections each composed of continuous road sections whose road types are only an expressway or only a non-expressway; and
   the controller estimates that the estimated average speed is the first speed when the road type of the downhill section is the expressway and estimates that the estimated average speed is the second speed when the road type of the downhill section is the non-expressway.

3. The hybrid vehicle control apparatus according to claim 1, wherein the controller estimates the estimated average speed based on an average speed at which the vehicle or vehicles other than the vehicle traveled through the downhill section in the past.

4. A hybrid vehicle control apparatus for controlling a hybrid vehicle which includes an internal combustion engine and a motor as drive sources of the vehicle, and a storage battery that supplies electric power to the motor, the vehicle being configured to perform regenerative braking by using the motor as a generator, and charge the storage battery with electric power generated as a result of the regenerative braking and electric power generated by using an output of the internal combustion engine, the hybrid vehicle control apparatus comprising:
   a controller configured to control the internal combustion engine and the motor so that the vehicle produces a demanded drive force and a remaining capacity of the storage battery remains above a predetermined minimum target remaining capacity, the controller being further configured to:
   obtain a planned travel route of the vehicle and extract a downhill section from the planned travel route as a target-downhill-section, the downhill section having a height difference between a start point and an end point of the downhill section, the height difference being greater in absolute value than a predetermined height difference threshold; and
   when the target-downhill-section is extracted, execute a downhill control operation that decreases the predetermined minimum target remaining capacity while the vehicle travels in at least a portion of a particular section as compared with when the vehicle travels in sections other than the particular section, the particular section extending between the end point of the target-downhill-section and a downhill control start point which is located upstream of the start point of the target-downhill-section by a predetermined distance, the portion of the particular section in which the predetermined minimum target remaining capacity is reduced including at least a section between the downhill control start point and the start point of the target-downhill-section, wherein the controller sets the predetermined height difference threshold to a relatively larger value when an estimated average speed is a first speed as compared to when the estimated average speed is second speed which is lower than the first speed, the estimated average speed being an estimated speed of the vehicle during travel in the downhill section.

5. The hybrid vehicle control apparatus according to claim 4, wherein the controller extracts the target-downhill-section from downhill sections each composed of continuous road sections whose road types are only an expressway or only a non-expressway; and the controller estimates that the estimated average speed is the first speed when the road type of the downhill section is the expressway and estimates that the estimated average speed is the second speed when the road type of the downhill section is the non-expressway.

6. The hybrid vehicle control apparatus according to claim 4, wherein the controller estimates the estimated average speed based on an average speed at which the vehicle or vehicles other than the vehicle traveled through the downhill section in the past.

* * * * *